(12) United States Patent
Park et al.

(10) Patent No.: US 12,156,083 B2
(45) Date of Patent: Nov. 26, 2024

(54) ELECTRONIC DEVICE PERFORMING HANDOVER AND METHOD FOR OPERATING THE SAME

(71) Applicant: Samsung Electronics Co., Ltd., Suwon-si (KR)

(72) Inventors: Jinsub Park, Suwon-si (KR); Songkyu Kim, Suwon-si (KR); Suhan Kim, Suwon-si (KR); Sanghyun Lee, Suwon-si (KR); Yonghyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/576,219

(22) Filed: Jan. 14, 2022

(65) Prior Publication Data

US 2022/0240139 A1    Jul. 28, 2022

Related U.S. Application Data

(63) Continuation of application No. PCT/KR2022/000057, filed on Jan. 4, 2022.

(30) Foreign Application Priority Data

Jan. 27, 2021    (KR) .................. 10-2021-0011279

(51) Int. Cl.
  *H04W 36/00*   (2009.01)
  *H04L 1/20*   (2006.01)
  *H04W 36/30*   (2009.01)

(52) U.S. Cl.
  CPC ....... *H04W 36/00837* (2018.08); *H04L 1/203* (2013.01); *H04W 36/0058* (2018.08); *H04W 36/305* (2018.08)

(58) Field of Classification Search
  CPC ......... H04W 36/00837; H04W 36/305; H04W 36/0058; H04L 1/203
  (Continued)

(56) References Cited

U.S. PATENT DOCUMENTS

2009/0305704 A1   12/2009   Kato et al.
2010/0124203 A1    5/2010   Tenny et al.
(Continued)

FOREIGN PATENT DOCUMENTS

JP   2007-243758 A   9/2007
JP   2008-053889 A   3/2008
(Continued)

OTHER PUBLICATIONS

3GPP TSG RAN WG2 #105bis; R2-1903521; Xi'an, China, Apr. 8-12, 2019.*
(Continued)

*Primary Examiner* — Faisal Choudhury
(74) *Attorney, Agent, or Firm* — Jefferson IP Law, LLP

(57) ABSTRACT

An electronic device is provided. The electronic device includes at least one processor, wherein the at least one processor is configured to receive an RRC reconfiguration message including information related to a conditional handover from a serving cell, determine whether to perform the conditional handover, based on the information related to the conditional handover included in the RRC reconfiguration message, determine whether at least one condition for postponing a time point at which the conditional handover is performed is satisfied, based on the determination to perform the conditional handover, and postpone the time point at which the conditional handover is performed, based on satisfaction of at least some of the at least one condition. Other various embodiments are possible.

16 Claims, 26 Drawing Sheets

(58) Field of Classification Search
USPC .......................................................... 370/331
See application file for complete search history.

(56) References Cited

U.S. PATENT DOCUMENTS

| | | |
|---|---|---|
| 2011/0250887 A1 | 10/2011 | Tenny |
| 2012/0294287 A1 | 11/2012 | Jeong et al. |
| 2014/0126545 A1 | 5/2014 | Temura et al. |
| 2016/0183192 A1* | 6/2016 | Kang ................ H04M 1/72463 370/311 |
| 2018/0279193 A1 | 9/2018 | Park et al. |
| 2019/0223073 A1* | 7/2019 | Chen ................... H04W 36/365 |
| 2019/0312678 A1* | 10/2019 | Yokomakura ......... H03M 13/27 |
| 2019/0387440 A1 | 12/2019 | Yiu et al. |
| 2020/0267604 A1 | 8/2020 | Hwang et al. |
| 2020/0413392 A1* | 12/2020 | Purkayastha ..... H04W 36/0088 |
| 2022/0174562 A1* | 6/2022 | Da Silva ............... H04W 76/27 |
| 2022/0255591 A1* | 8/2022 | Park .................... H04W 36/362 |
| 2023/0086614 A1* | 3/2023 | Kim .................. H04W 36/0079 370/331 |

FOREIGN PATENT DOCUMENTS

| | | |
|---|---|---|
| JP | WO2013/024574 A1 | 2/2013 |
| JP | 2014-003668 A | 1/2014 |
| KR | 10-2011-0085441 A | 7/2011 |
| KR | 10-2011-0086623 A | 7/2011 |
| KR | 10-2018-0127191 A | 11/2018 |
| KR | 10-2019-0087299 A | 7/2019 |
| KR | 10-2020-0099420 A | 8/2020 |
| KR | 10-2020-0102497 A | 8/2020 |
| WO | 2018/077428 A1 | 5/2018 |
| WO | 2018/156696 A1 | 8/2018 |
| WO | 2018/170777 A1 | 9/2018 |
| WO | 2018/175721 A1 | 9/2018 |
| WO | 2019/136827 A1 | 7/2019 |
| WO | 2020/118488 A1 | 6/2020 |
| WO | 2020/215325 A1 | 10/2020 |

OTHER PUBLICATIONS

International Search Report dated May 16, 2022, issued in International Application No. PCT/KR2022/000057.
LG Electronics Inc., Consideration to Support Conditional HO in LTE, R2-1905096, 3GPP TSG-RAN WG2 Meeting #105bis, XP 051702373, Apr. 6, 2019, Xi'an, China.
ETRI, Considerations on Conditional Handover, R2-1900923, 3GPP TSG-RAN WG2 Meeting #105, XP 051602294, Feb. 15, 2019, Athens, Greece.
European Search Report dated Jul. 25, 2024, issued in European Application No. 22746094.6.
European Search Report dated Oct. 16, 2024, issued in European Application No. 22746094.6.

* cited by examiner

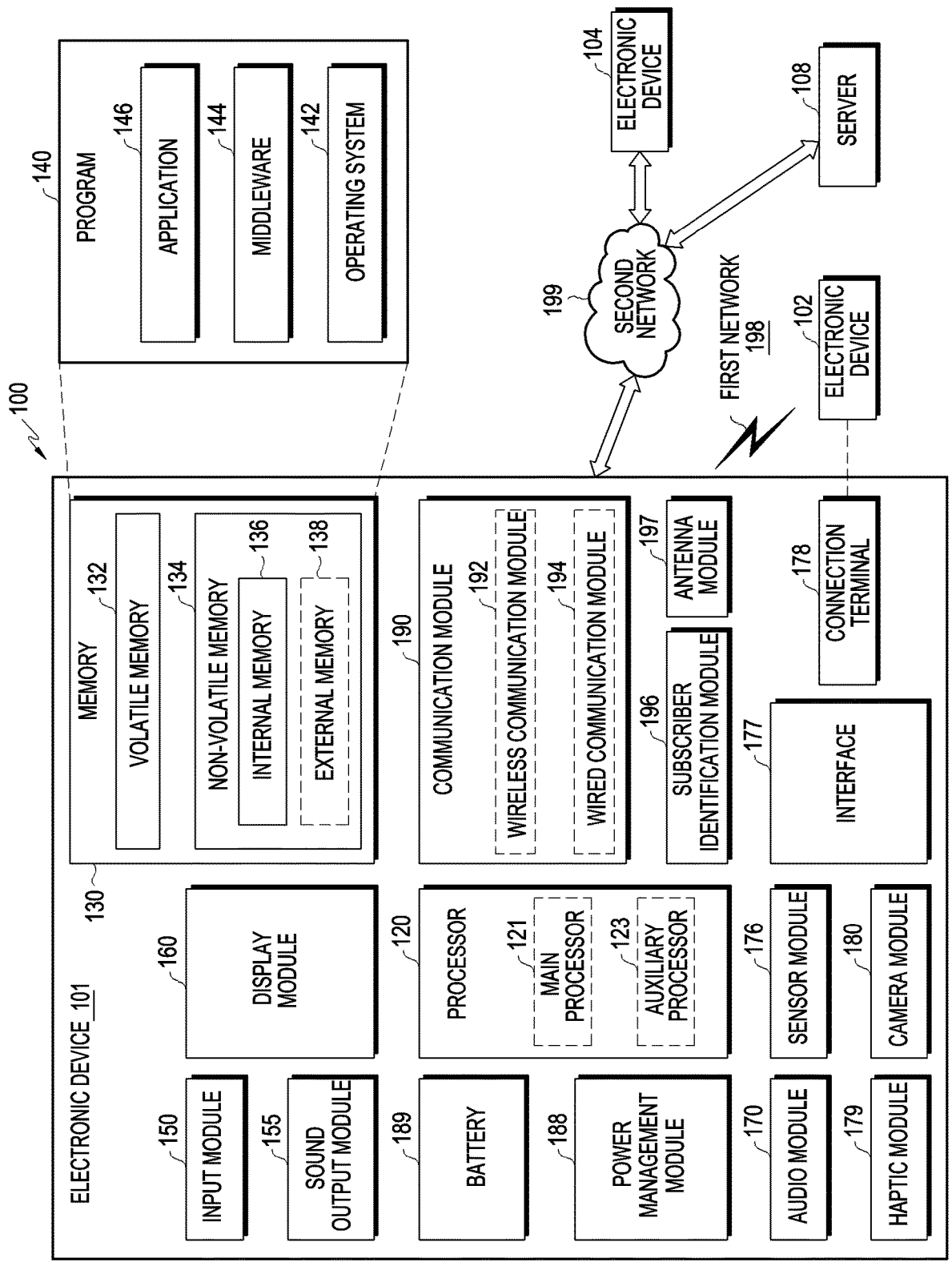

ELECTRONIC DEVICE PERFORMING HANDOVER AND METHOD FOR OPERATING THE SAME

CROSS-REFERENCE TO RELATED APPLICATION(S)

This application is a continuation application, claiming priority under § 365(c), of an International application No. PCT/KR2022/000057, filed on Jan. 4, 2022, which is based on and claims the benefit of a Korean patent application number 10-2021-0011279, filed on Jan. 27, 2021, in the Korean Intellectual Property Office, the disclosure of which is incorporated by reference herein in its entirety.

BACKGROUND

Field

The disclosure relates to an electronic device for performing a handover and a method of operating the same. More particularly, the disclosure relates to an electronic device and a method of delaying the time point at which the handover is performed when a condition for the delay is satisfied even though a handover execution condition is satisfied.

Description of Related Art

A network may configure a user equipment (UE) based on one or more candidate target cells (for example, SpCells) within a conditional reconfiguration. For example, the UE may evaluate a condition of each of the configured candidate target cells. The UE may apply a conditional reconfiguration related to one of the target cells that satisfy an execution condition. In Release 16, the network may provide a configuration parameter for the target SpCell within an IE of Conditional Reconfiguration.

A function of a conditional handover (CHO) in the conditional reconfiguration is provided. The network supporting the function of the conditional handover may transmit a message including information on a candidate target cell for the handover and a handover execution condition to the UE. When the handover execution condition is satisfied, the UE may perform a handover procedure for the candidate target cell.

The above information is presented as background information only to assist with an understanding of the disclosure. No determination has been made, and no assertion is made, as to whether any of the above might be applicable as prior art with regard to the disclosure.

SUMMARY

A user equipment (UE) supporting a conditional handover function may receive a message including information on candidate target cells for a handover and a handover execution condition from a network. When satisfaction of the handover execution condition is identified, the UE may perform a handover procedure to a corresponding target cell. However, the UE is configured to monitor only whether the handover execution condition is satisfied and perform the handover according to a monitoring result, and thus a state of the UE and/or a condition of a neighboring cell may be not considered at a corresponding time point. If the UE performs the handover according to satisfaction of the handover execution condition during an ultra-low latency service, the ultra-low latency service may be delayed. In various situations, such as the above case, the UE may need to delay a time point at which the conditional handover is performed. Alternatively, when it is determined that the UE does not perform the conditional handover, for example, when the traffic size is large and a bandwidth of the target cell is large, it is required to perform the conditional handover early.

Aspects of the disclosure are to address at least the above-mentioned problems and/or disadvantages and to provide at least the advantages described below. Accordingly, an aspect of the disclosure is to provide an electronic device and a method of delaying the time point at which the handover is performed when a condition for the delay is satisfied even though a handover execution condition is satisfied.

Another aspect of the disclosure is to provide an electronic device and a method of operating the same that performs the handover when a condition of the early performance is satisfied even though a handover execution condition is not satisfied.

Additional aspects will be set forth in the description which follows.

According to various embodiments, an electronic device includes at least one processor, wherein the at least one processor is configured to receive a radio resource control (RRC) reconfiguration message including information related to a conditional handover from a serving cell, determine whether to perform the conditional handover, based on the information related to the conditional handover included in the RRC reconfiguration message, determine whether at least one condition for postponing a time point at which the conditional handover is performed is satisfied, based on the determination to perform the conditional handover, and postpone the time point at which the conditional handover is performed, based on satisfaction of at least some of the at least one condition.

According to various embodiments, an electronic device includes at least one processor, wherein the at least one processor is configured to receive an RRC reconfiguration message including information related to a conditional handover from a serving cell, identify that an execution condition of a conditional handover to a target cell included in the information relate to the conditional handover of the RRC reconfiguration message is not satisfied, determine whether at least one condition for performing the conditional handover to the target cell early is satisfied, based on non-satisfaction of the execution condition of the conditional handover, and perform the handover to the target cell, based on satisfaction of the at least one condition for early performing the conditional handover.

According to various embodiments, a method of operating an electronic device includes receiving an RRC reconfiguration message including information related to a conditional handover from a serving cell, determining whether to perform the conditional handover, based on the information related to the conditional handover included in the RRC reconfiguration message, determining whether at least one condition for postponing a time point at which the conditional handover is performed is satisfied, based on the determination to perform the conditional handover, and postponing the time point at which the conditional handover is performed, based on satisfaction of at least some of the at least one condition.

According to various embodiments, an electronic device and a method of operating the same capable of delaying a time point at which a handover is performed may be provided when a condition for the delay is satisfied even when a handover execution condition is satisfied. Accordingly, it is possible to prevent the performance of communication from deteriorating according to execution of a handover which does not consider a condition of an electronic device and/or a condition of a neighboring cell.

According to various embodiments, an electronic device and a method of operating the same capable of performing a handover is performed may be provided when a condition for the early performance is satisfied even when a handover execution condition is not satisfied. Accordingly, it is possible to prevent deterioration of the performance of communication that can be generated due to non-performance of a handover even though a condition of a serving cell is worsened.

BRIEF DESCRIPTION OF THE DRAWINGS

FIG. 1 is a block diagram illustrating an electronic device within a network environment according to an embodiment of the disclosure;

DETAILED DESCRIPTION

Figure 2A:
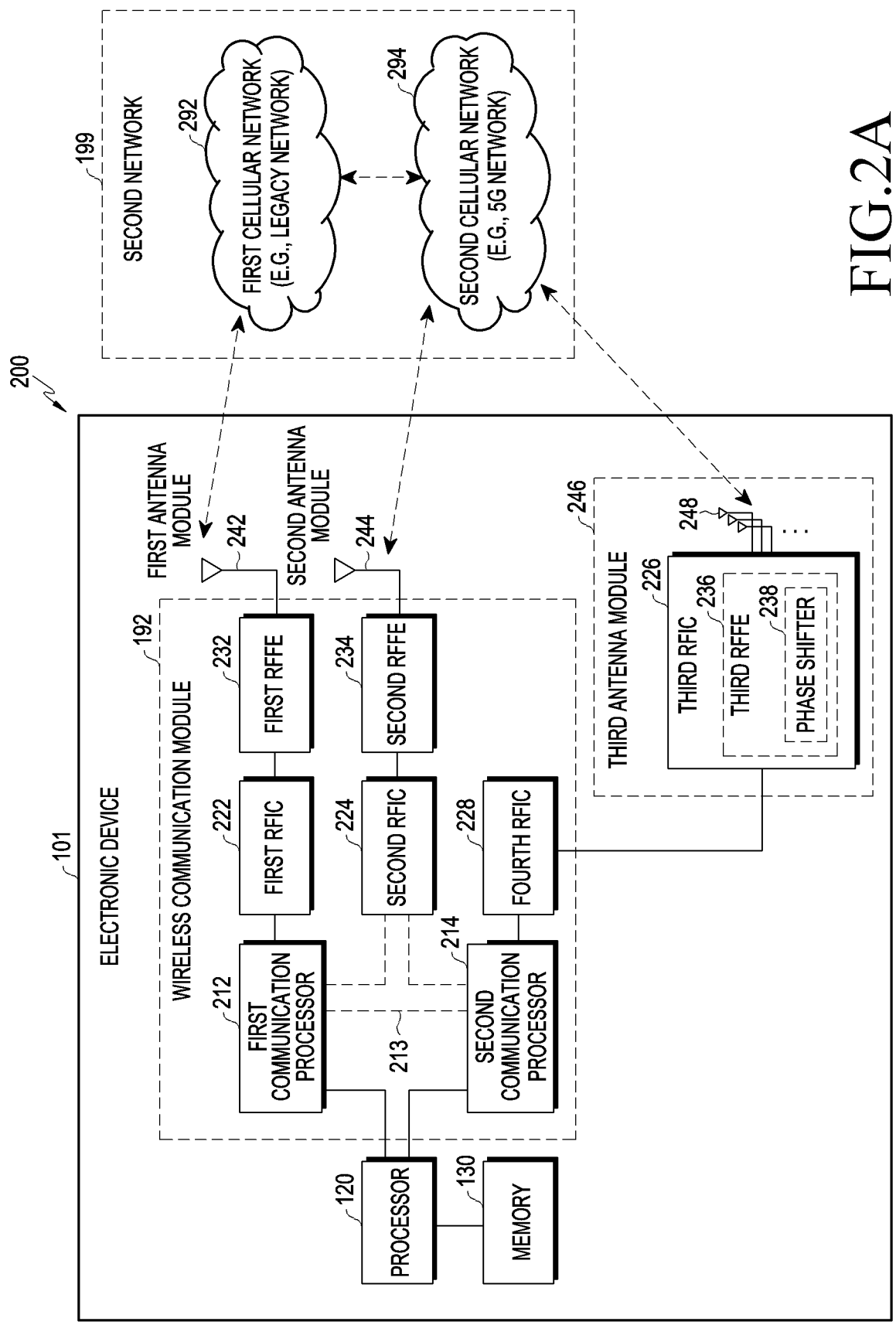
FIGS. 2A and 2B are block diagrams illustrating an electronic device supporting legacy network communication and 5G network communication according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a communication module 192 (e.g., a cellular communication module, a short-range communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The communication module 192 may identify or authenticate the electronic device 101 in a communication network, such as the first network 198 or the second network 199, using subscriber information (e.g., international mobile subscriber identity (IMSI)) stored in the subscriber identification module 196.

The communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The communication module 192 may support a high-frequency band (e.g., the mmWave band) to achieve, e.g., a high data transmission rate. The communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The communication module 192 may support various requirements specified in the electronic device 101, an external electronic device (e.g., the electronic device 104), or a network system (e.g., the second network 199). According to an embodiment, the communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2B:
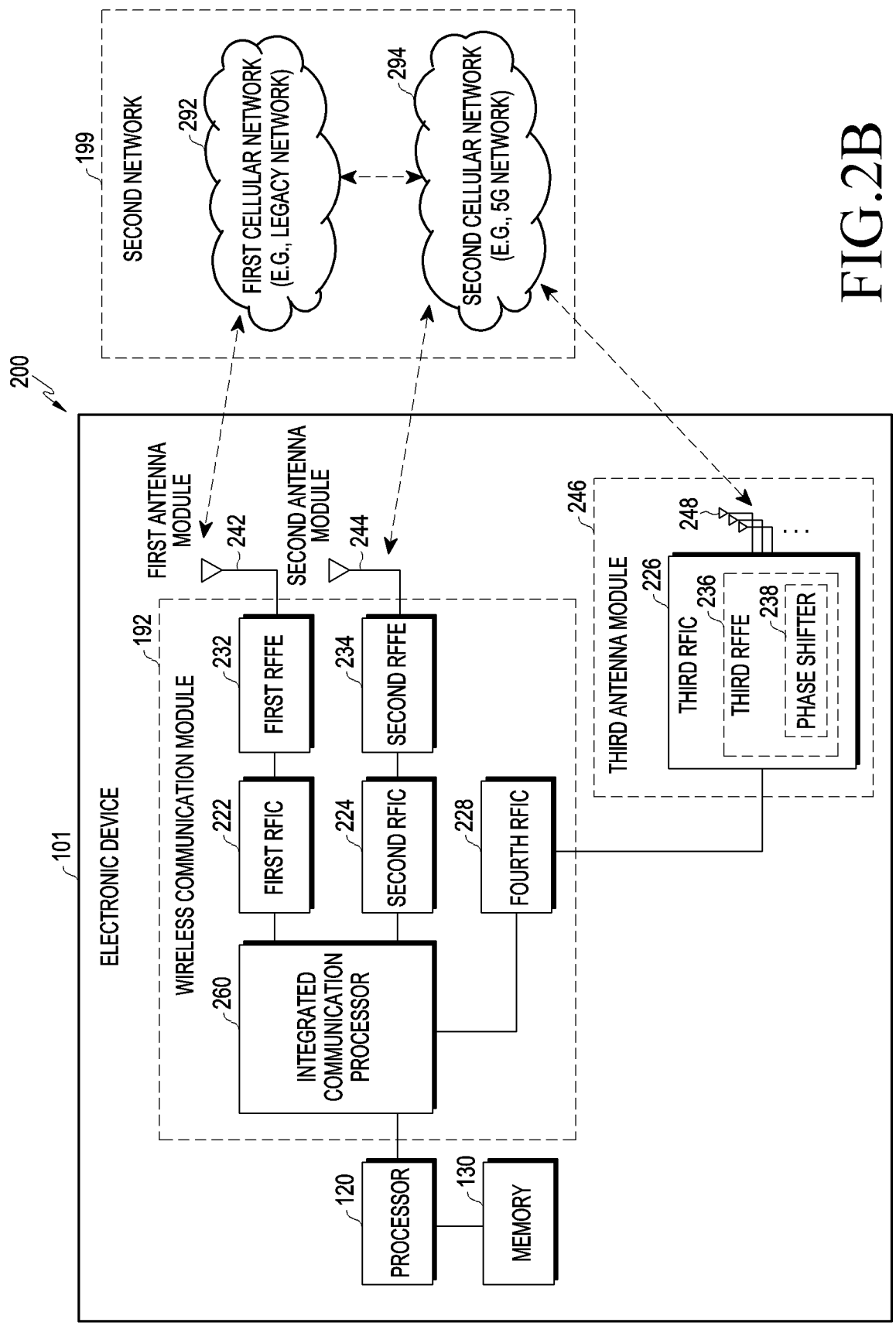

FIGS. 2A and 2B are block diagrams 200 of an electronic device for supporting legacy network communication and 5G network communication according to various embodiments of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include the processor 120 and the memory 130. A second network 199 may include a first cellular network 292 and a second cellular network 294. According to another embodiment of the disclosure, the electronic device 101 may further include at least one of the elements illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may configure at least a portion of the communication module 192. According to another embodiment of the disclosure, the fourth RFIC 228 may be omitted or may be included as a part of the third RFIC 226.

The first communication processor 212 may support establishment of a communication channel in a band to be used for wireless communication with the first cellular network 292 and legacy network communication through the established communication channel According to various embodiments of the disclosure, the first cellular network may be a legacy network including a second generation (2G), 3G, 4G, or long term evolution (LTE) network. The second communication processor 214 may support establishment of a communication channel corresponding to a predetermined band (for example, about 6 GHz to about 60 GHz) among bands to be used for wireless communication with the second network 294 and 5G network communication through the established communication channel According to various embodiments of the disclosure, the second cellular network 294 may be a 5G network defined in the 3GPP. In addition, according to an embodiment of the disclosure, the first communication processor 212 or the second communication processor 214 may support establishment of a communication channel corresponding to another predetermined band (for example, equal to or lower than about 6 GHz) among bands to be used for wireless communication with the second cellular network 294 and 5G network communication through the established communication channel.

The first communication processor 212 may transmit and receive data to and from the second communication processor 214. For example, data classified as data to be transmitted through the second cellular network 294 may be changed to be transmitted through the first cellular network 292. In this case, the first communication processor 212 may receive transmission data from the second communication processor 214. For example, the first communication processor 212 may transmit and receive data to and from the second communication processor 214 through an interface 213 between processors. The interface 213 between processors may be implemented as, for example, a universal asynchronous receiver/transmitter (UART) (for example, a high speed-UART (HS-UART) or a peripheral component interconnect bus express (PCIe) interface), but there is no limitation therein. Alternatively, the first communication processor 212 and the second communication processor 214 may exchange control information and packet data information through, for example, a shared memory. The first communication processor 212 may transmit and receive various pieces of information, such as detection information, information on an output intensity, and Resource Block (RB) allocation information to and from the second communication processor 214.

According to implementation, the first communication processor 212 may not be directly connected to the second communication processor 214. In this case, the first communication processor 212 may transmit and receive data to and from the second communication processor 214 through the processor 120 (for example, an application processor). For example, the first communication processor 212 and the second communication processor 214 may transmit and receive data to and from the processor 120 (for example, an application processor) through an HS-UART interface or a PCIe interface, but there is no limitation on the type thereof. Alternatively, the first communication processor 212 and the second communication processor 214 may exchange control information and packet data information with the processor 120 (for example, an application processor) through a shared memory.

According to an embodiment of the disclosure, the first communication processor 212 and the second communication processor 214 may be implemented within a single chip or a single package. According to various embodiments of the disclosure, the first communication processor 212 or the second communication processor 214 may be constructed with the processor 120, the auxiliary processor 123, or the communication module 190 within a single chip or a single package.

Referring to FIG. 2B, an integrated communication processor 260 may support all functions for communication with the first cellular network 292 and the second cellular network 294.

In transmission, the first RFIC 222 may convert a baseband signal generated by the first communication processor 212 into a radio frequency (RF) signal of about 700 MHz to about 3 GHz used for the first cellular network 292 (for example, legacy network). In reception, the RF signal may be acquired from the first cellular network 292 (for example, legacy network) through an antenna (for example, the first antenna module 242) and may be preprocessed through the RFFE (for example, first RFFE 232). The first RFIC 222 may convert the preprocessed RF signal into a baseband signal to be processed by the first communication processor 212.

In transmission, the second RFIC 224 may convert a baseband signal generated by the first communication processor 212 or the second communication processor 214 into an RF signal (hereinafter, referred to as a 5G Sub6 RF signal) in a Sub6 band (for example, equal to or lower than about 6 GHz) used in the second cellular network 294 (for example, 5G network). In reception, a 5G Sub6 RF signal may be acquired from the second cellular network 294 (for example, 5G network) through an antenna (for example, the second antenna module 244) and may be preprocessed through the RFFE (for example, second RFFE 234). The second RFIC 224 may convert the preprocessed 5G Sub6 RF signal into a baseband signal to be processed by the corresponding communication processor among the first communication processor 212 or the second communication processor 214.

The third RFIC 226 may convert a baseband signal generated by the second communication processor 214 into an RF signal (hereinafter, referred to as a 5G Above6 RF signal) in a 5G Above6 band (for example, from about 6 GHz to about 60 GHz) used by the second cellular network 294 (for example, 5G network). In reception, a 5G Above6 RF signal may be acquired from the second cellular network 294 (for example, 5G network) through an antenna (for example, the antenna 248) and may be preprocessed through the third RFFE 236. The third RFIC 226 may convert the preprocessed 5G Above6 RF signal into a baseband signal to be processed by the second communication processor 214. According to an embodiment of the disclosure, the third RFFE 236 may be configured as a part of the third RFIC 226.

The electronic device 101 may include the fourth RFIC 228 separately from the third RFIC 226 or as a part thereof according to an embodiment. In this case, after converting a baseband signal generated by the second communication processor 214 into an RF signal (hereinafter, referred to as an IF signal) in an intermediate frequency band (for example, about 9 GHz to about 11 GHz), the fourth RFIC 228 may transmit the IF signal to the third RFIC 226. The third RFIC 226 may convert the IF signal into a 5G Above6 RF signal. In reception, a 5G Above6 RF signal may be received from the second cellular network 294 (for example, 5G network) through an antenna (for example, antenna 248) and converted into an IF signal by the third RFIC 226. The fourth RFIC 228 may convert the IF signal into a baseband signal to be processed by the second communication processor 214.

According to an embodiment of the disclosure, the first RFIC 222 and the second RFIC 224 may be implemented as at least a part of a single chip or a single package. According to various embodiments of the disclosure, when the first RFIC 222 and the second RFIC 224 are implemented as a single chip or a single package in FIG. 2A or FIG. 2B, they may be implemented as an integrated RFIC. In this case, the integrated RFIC may be connected to the first RFFE 232 and the second RFFE 234 to convert a baseband signal into a signal in a band supported by the first RFFE 232 and/or the second RFFE 234 and may transmit the converted signal to one of the first RFFE 232 and the second RFFE 234. According to an embodiment of the disclosure, the first RFFE 232 and the second RFFE 234 may be implemented as at least a portion of a single chip or a single package. According to an embodiment of the disclosure, at least one of the first antenna module 242 or the second antenna module 244 may be omitted or may be connected to another antenna module to process RF signals in a plurality of corresponding bands.

According to an embodiment of the disclosure, the third RFIC 226 and the antenna 248 may be disposed on the same substrate to form the third antenna module 246. For example, the communication module 192 or the processor 120 may be disposed on a first substrate (for example, main PCB). In this case, the third RFIC 226 may be disposed in a partial area (for example, bottom side) of a second substrate (for example, sub PCB) separated from the first substrate and the antennas 248 may be disposed in another partial area (for example, top side) to configure the third antenna module 246. By disposing the third RFIC 226 and the antennas 248 on the same substrate, it is possible to reduce the length of a transmission line therebetween. This is to reduce loss (for example, attenuation) of the signal in a high frequency band (for example, about 6 GHz to about 60 GHz) used for, for example, 5G network communication due to the transmission line. Accordingly, the electronic device 101 may increase a quality or a speed of communication with the second cellular network 294 (for example, 5G network).

According to an embodiment of the disclosure, the antennas 248 may be configured as an antenna array including a plurality of antennal elements which can be used for beamforming. In this case, the third RFIC 226 may include, for example, a plurality of phase shifters 238 corresponding to the plurality of antenna elements as a part of the third RFFE 236. In transmission, each of the plurality of phase shifters 238 may convert a phase of a 5G Above6 RF signal to be transmitted to the outside of the electronic device (for example, a base station of the 5G network) through a corresponding antenna element. In reception, each of the plurality of phase shifters 238 may convert the phase of the 5G Above6 RF signal received from the outside through the corresponding antenna element into the same phase or substantially the same phase. This enables transmission or reception through beamforming between the electronic device 101 and the outside.

The second cellular network 294 (for example, 5G network) may operate independently from the first cellular network 292 (for example, legacy network) (for example, stand-alone (SA)) or operate through a connection to thereto (for example, non-stand along (NSA)). For example, in the 5G network, only an access network (for example, a 5G radio access network (RAN) or a next generation RAN (NG RAN)) may exist without a core network (for example, a next generation core (NGC)). In this case, the electronic device 101 may access the access network of the 5G network and then access an external network (for example, Internet) under the control of the core network (for example, evolved packed core (EPC) of the legacy network. Protocol information (for example, LTE protocol information) for communication with the legacy network and protocol information (for example, new radio (NR) protocol information) for communication with the 5G network may be stored in the memory 230 and may be accessed by another element (for example, the processor 120, the first communication processor 212, or the second communication processor 214).

Figure 3A:
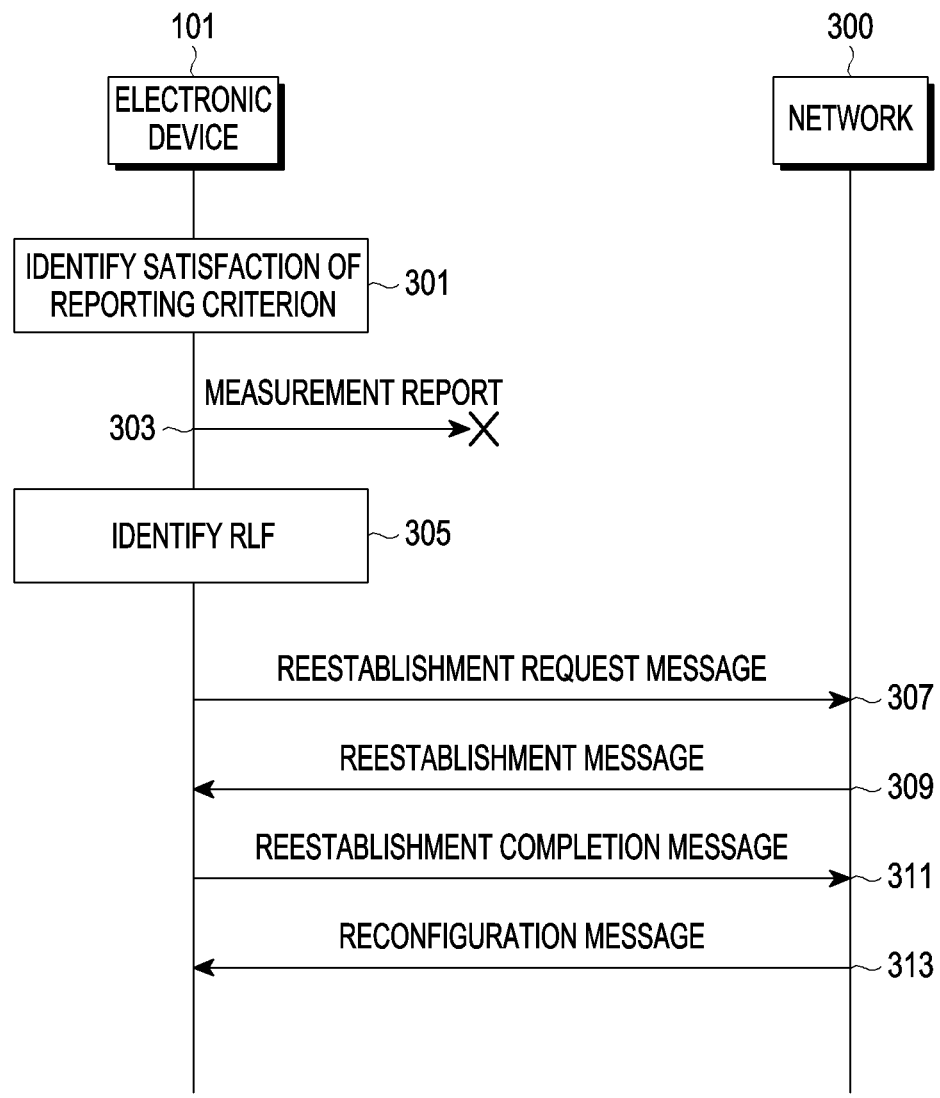
FIG. 3A is a flowchart illustrating a method of operating an electronic device and a network according to an embodiment of the disclosure.

FIG. 3A is a flowchart illustrating a method of operating an electronic device and a network according to an embodiment of the disclosure. It may be understood by those skilled in the art that the electronic device 101 and a network 300 according to various embodiments can perform at least some of the operations described with reference to FIG. 3A.

Referring to FIG. 3A, in operation 301, the electronic device 101 may identify satisfaction of a reporting criterion. Although not illustrated, the electronic device 101 (for example, at least one of the processor 120 of FIG. 1, the first communication processor 212 of FIG. 2A, the second communication processor 214 of FIG. 2A, or the integrated communication processor 260 of FIG. 2B) may receive an RRC connection reconfiguration (for example, RRC connection reconfiguration of $3^{rd}$ generation project partnership (3GPP) technical specification (TS) 36.331 or RRC reconfiguration of 3GPP TS 38.331) message from the network 300. The network 300 may be a base station (for example, at least one of eNB, gNB, ng-eNB, or en-gNB) corresponding to communication for configuring, for example, an RRC connection reconfiguration message, but when some of the functions of the base station are virtualized, may be implemented as at least a portion of hardware for the radio control and a server for performing a virtualized function. The network 300 may also be named a serving cell. When the electronic device 101 is in, for example, an RRC-connected state (RRC CONNECTED state), the network 300 may perform an RRC connection reconfiguration procedure. For example, when a measurement configuration (for example, 3GPP TS 38.331 or measConfig) of 36.331) is included in the RRC connection reconfiguration message, the electronic device 101 may perform a measurement configuration procedure (for example, measurement configuration procedure configured in 3GPP TS 38.331 or 36.331). For example, the electronic device 101 may receive a request for measuring the following types.

Intra-frequency measurements: measurement in downlink carrier frequency(s) of serving cell(s)

Inter-frequency measurements: measurement in frequencies different from any frequency among downlink carrier frequency(s) of serving cell(s)

Measurement in frequency in inter-RAT (for example, NR, URTA, GERAN, CDMA 2000 HRPD, or DCMA 2000 1xRTT)

In the measurement configuration, information on a measurement object may be included. The measurement object may include, for example, subcarrier spacing of a reference signal to be measured and a frequency/time location. The electronic device 101 may identify a frequency for measurement based on a measurement object within the measurement configuration. The measurement object may include information indicating a frequency to be measured (for example, ARFCN-ValueEUTRA and/or ARFCN-ValueNR), a measurement object identity, or a cell black list and/or a cell white list.

According to various embodiments of the disclosure, the measurement configuration of the RRC connection reconfiguration message may include a reporting configuration. For example, the reporting configuration may include at least one of a reporting criterion, a reporting format, or an RS type. The reporting criterion is a condition for triggering a UE to transmit a measurement report and may be periodic or single event description. The reporting format may be information on the number of reports which the UE includes in the measurement report and relevant information (for example, the number of cells to be reported) in LTE communication. The reporting format may be the number of reports per cell and per beam to be included in the measurement report and other relevant information (for example, the maximum number of reports per cell and the maximum number of cells) in 5G communication. The RS type may indicate, for example, a beam to be used by the UE and an RS of the measurement result.

According to various embodiments of the disclosure, the measurement configuration of the RRC connection reconfiguration message may include at least one of a measurement identity, a quantity configuration, or a measurement gap. The measurement identity may be a list of measurement identities related to the measurement objects. The quantity configuration may define a periodic report of measurement filtering configuration and measurement used for all event evaluations and relevant reports. The measurement gap is a period on which the UE performs measurement and may be, for example, an interval in which uplink or downlink transmission is not scheduled.

The electronic device 101 may measure at least one of reference signal received power (RSRP), reference signal received quality (RSRQ), reference signal strength indicator (RSSI), or signal to interference-plus-noise ratio (SINR) corresponding to at least one of an inter-frequency, an intra-frequency, or an inter-RAT. The performance of RSRP measurement by the electronic device 101 may mean that at least one of the processor 120, the first communication processor 212, the second communication processor 214, the integrated communication processor 260, or an integrated SoC (not shown) identifies an RSRP measurement value, but there is no limitation. For example, the electronic device 101 may identify, as the RSRP measurement value, a linear average of power distribution (in units of watts [W]) of a resource element carrying at least one of a reference signal or a synchronization signal within a frequency bandwidth to be measured. Meanwhile, any signal defined in the 3GPP can be the reference signal and the synchronization signal. For example, the electronic device 101 may identify the RSRP measurement value based on the linear average of the power distribution at a reference point. For example, in LTE communication, the electronic device 101 may identify the RSRP measurement value based on the linear average of power distribution at an antenna connector of an antenna (for example, the first antenna module 242) for receiving the corresponding communication signal. For example, in FR1 of NR, the electronic device 101 may identify the RSRP measurement value based on the linear average of power distribution at an antenna connector of an antenna (for example, the first antenna module 242) for receiving the corresponding communication signal. For example, in FR2 of NR, the electronic device 101 may identify a measurement value (for example, synchronization signal-reference signal received power (SS-RSRP)) based on a combined signal from an antenna element (for example, at least one antenna element of the antenna 248) corresponding to a given receiver branch. Although not illustrated, the electronic device 101 may include at least one sensor (for example, at least one of a voltage sensor, a current sensor, or a power sensor) capable of measuring power at a reference point (for example, antenna connector) and may measure power at the reference point based on detection data from at least one sensor. As described above, there is no limitation on the reference point, and thus there is no limitation on a location to which at least one sensor is connected. In various embodiments of the disclosure, the performance of the RSRQ measurement by the electronic device 101 may mean that at least one of the processor 120, the first communication processor 212, the second communication processor 214, the integrated communication processor 260, or an integrated SoC (not shown) identifies the RSRQ measurement value, but there is no limitation.

The electronic device 101 may identify that the measurement result satisfies the measurement condition. The electronic device 101 may identify the measurement result from, for example, a physical layer, and may determine whether the reporting criterion is satisfied based on the measurement result. The electronic device 101 may perform filtering (for example, layer 3 filtering) on the performance result and determine whether the reporting criterion is satisfied based on the filtering result. In various embodiments of the disclosure, the "measurement result" may refer to, for example, at least one of a value acquired from a physical layer or a filtering value of the value acquired from the physical layer. The reporting criterion may be described below, but there is no limitation.

Event A1: Serving becomes better than threshold
Event A2: Serving becomes worse than threshold
Event A3: Neighbour becomes offset better than PCell/PSCell (or, SpCell of NR)
Event A4: Neighbour becomes worse than threshold
Event A5: PCell/PSCell (or, SpCell of NR) becomes worse than threshold1 and neighbour (or, neighbour/SCell of NR) becomes better than threshold2
Event A6: Neighbour becomes offset better than SCell (or, SCell of NR)

Event B1: Inter RAT neighbour becomes better than threshold

Event B2: PCell becomes worse than threshold) and inter RAT neighbour becomes better than threshold2

The above-described reporting criteria may follow, for example, 3GPP TS 36.331 or 3GPP TS 38.331 but there is no limitation on the type thereof.

According to various embodiments of the disclosure, the electronic device 101 does not perform measurement which should be performed by the measurement configuration all the time, but may perform the measurement according to the measurement period.

According to various embodiments of the disclosure, the electronic device 101 may perform the measurement report in operation 303 based on satisfaction of the reporting criterion. For example, when the reporting criterion which is satisfied among the reporting criteria is maintained for a time-to-trigger, the electronic device 101 may transmit a measurement report message to the network 300. The electronic device 101 may configure the measurement result within the measurement report message (for example, measResults of 3GPP TS 38.331 or 3GPP TS 36.331) for a measurement identity for which the measurement report procedure is triggered. An information element (IE) of the measurement result (for example, at least one of RSRP, RSRQ, or SINR) may include the result measured for intra-frequency, inter-frequency, and an inter-RAT mobility. For example, the measurement report message may include a measurement identity and a measurement result. However, the network 300 may fail in receiving the measurement report message according to an electric field condition between the electronic device 101 and the network 300. Accordingly, the network 300 may not transmit a response message (for example, a handover command) corresponding to the measurement report message to the electronic device 101.

In operation 305, the electronic device 101 may identify (or declare) radio link failure (RLF) based on failure in reception of the response message (for example, handover command). The electronic device 101 may transmit a reestablishment request message to the network 300 based on the identification of the RLF in operation 307. The network 300 may transmit a reestablishment complement message (for example, RRCConnectionReestablishment message of 3GPP TS 36.331 or RRCReestablishment message of 3GPP TS 38.331) to the electronic device 101 based on reception of the reestablishment request message (for example, RRCConnectionReestablishmentRequest message of 3GPP TS 36.331 or RRCReestablishmentRequest message of 3GPP TS 38.331) in operation 309. The electronic device 101 may transmit an RRC reestablishment confirmation message (for example, RRCConnectionReestablishmentComplete message of 3GPP TS 36.331 or RRCReestablishmentComplete message of 3GPP TS 38.331) to the network 300 based on reception of the reestablishment completion message in operation 311. The network 300 may transmit the RRC reconfiguration message to the electronic device 101 based on reception of the reestablishment completion message. As described above, the handover may be delayed according to failure of reception of the measurement report message by the network 300 from the electronic device 101.

Figure 3B:
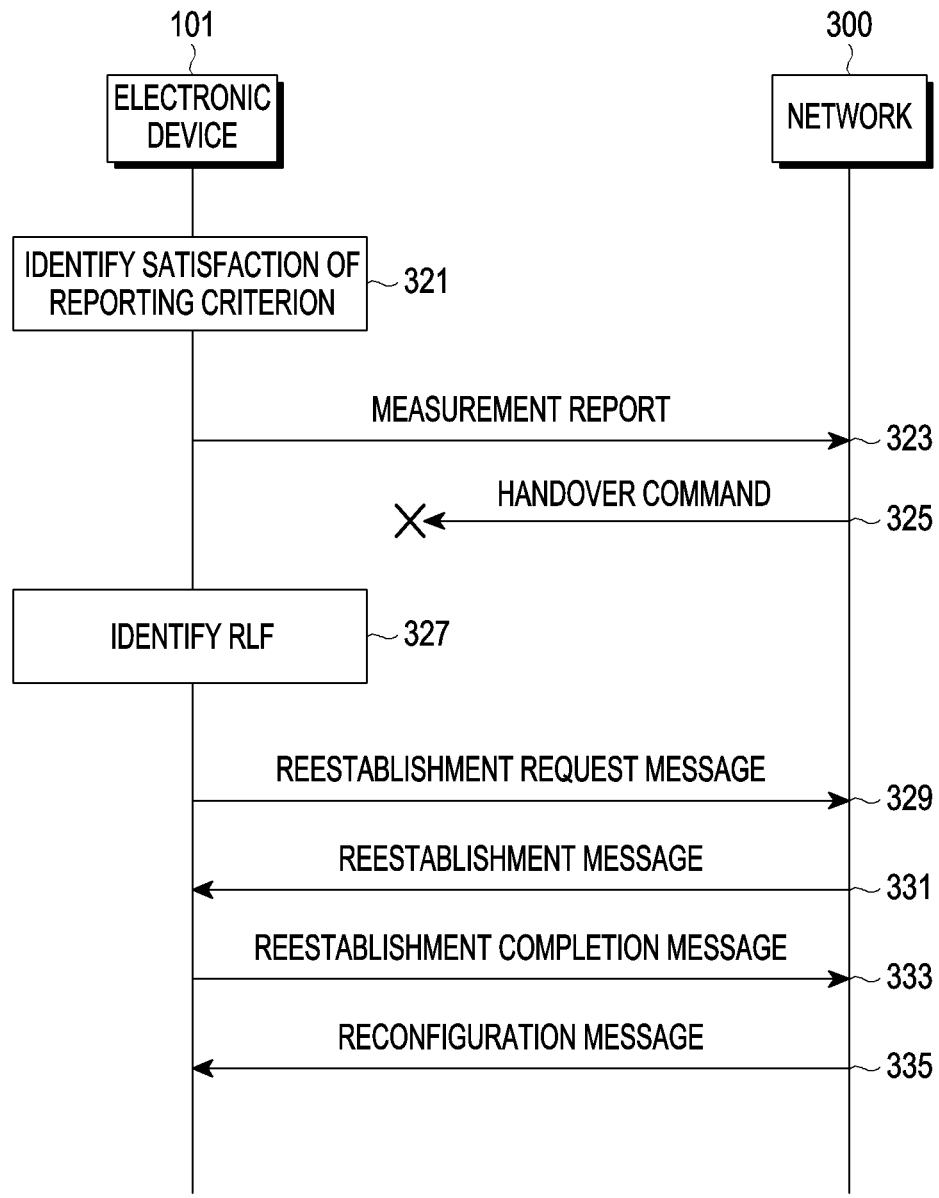
FIG. 3B is a flowchart illustrating a method of operating an electronic device and a network according to an embodiment of the disclosure.

FIG. 3B is a flowchart illustrating a method of operating an electronic device and a network according to an embodiment of the disclosure. It may be understood by those skilled in the art that the electronic device 101 and the network 300 according to various embodiments can perform at least some of the operations described with reference to FIG. 3B.

Referring to FIG. 3B, in operation 321, the electronic device 101 (for example, at least one of the processor 120 of FIG. 1, the first communication processor 212 of FIG. 2A, the second communication processor 214 of FIG. 2A, or the integrated communication processor 260 of FIG. 2B) may identify satisfaction of the reporting criterion. In operation 323, the electronic device 101 may perform the measurement report. In operation 325, the network 300 may transmit a handover command to the electronic device 101 based on reception of the measurement report message. However, the electronic device 101 may fail in receiving the handover command according to an electric field condition between the network 300 and the electronic device 101. The electronic device 101 may identify (or declare) RLF according to failure in reception of the response message from the network 300 in operation 327. In operation 329, the electronic device 101 may transmit a reestablishment request message to the network 300. The network 300 may transmit a reestablishment message to the electronic device 101 in operation 331. In operation 333, the electronic device 101 may transmit a reestablishment completion message to the network 300. The network 300 may transmit a reconfiguration message to the electronic device 101 in operation 353. As described above, the handover may be delayed according to failure of reception of the measurement report message by the network 300 from the electronic device 101.

Figure 4:
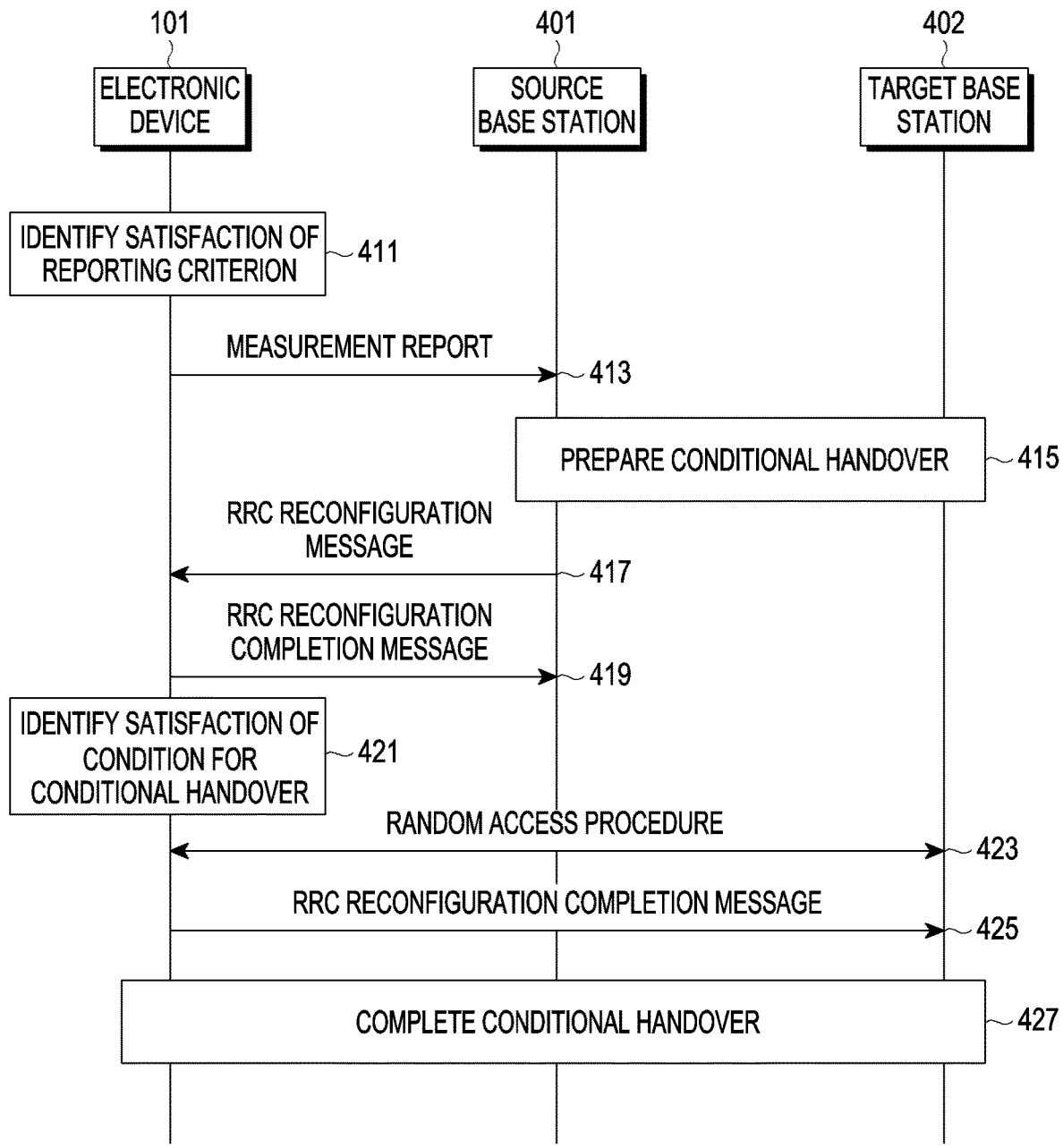
FIG. 4 is a flowchart illustrating a method of operating an electronic device and a network according to an embodiment of the disclosure.

FIG. 4 is a flowchart illustrating a method of operating an electronic device and a network according to an embodiment of the disclosure. It may be understood by those skilled in the art that the electronic device 101 and the network 300 according to various embodiments can perform at least some of the operations described with reference to FIG. 4.

Referring to FIG. 4, it assumes the state in which the electronic device 101 (for example, at least one of the processor 120 of FIG. 1, the first communication processor 212 of FIG. 2A, the second communication processor 214 of FIG. 2A, or the integrated communication processor 260 of FIG. 2B) accesses a source base station 401. In operation 411, the electronic device 101 may identify satisfaction of a report condition. For example, the electronic device 101 may identify that the reporting criterion is satisfied based on the measurement configuration and the measurement result included in the RRC reconfiguration message received from the source base station 401. In operation 413, the electronic device 101 may transmit a measurement report message to the source base station 401.

In operation 415, the source base station 401 may determine a target base station 402 based on information included in the measurement report message and perform a procedure of preparing a conditional handover with the target base station 402. For example, when the handover is determined, the source base station 401 may transmit a HandoverPreparation message which makes a request for the handover to the target base station 402 for the handover. The HandoverPreparation message may include, for example, RRC information used by the source base station 401 and/or UE context of the electronic device 101, but there is not limitation. The target base station 402 may transmit a handover request acknowledgement message to the source base station 401 in response to reception of the HandoverPreparation message.

In operation 417, the source base station 401 may transmit an RRC reconfiguration message to the electronic device 101. In operation 419, the electronic device 101 may transmit a reconfiguration completion message to the source base station 401. The RRC reconfiguration message may include information on the target base station 402 (for example, RRC setup information) and handover execution event-related information (for example, threshold, offset, Ohoen (for example, offset of A3 event), Oreestn (for example, offset of A3 event higher than or equal to Ohoen)). When the RRC reconfiguration message includes addition and/or change information of the conditional reconfiguration (for example, condReconfigAddModList), the electronic device 101 may add and/or change the conditional reconfiguration. The electronic device 101 may add information included in the RRC reconfiguration message to the electronic device 101 and store the same or may change the existing information. When the RRC reconfiguration message includes a conditional execution condition and/or a conditional RRC reconfiguration (condRRCReconfig), the electronic device may use the same for addition and/or change.

For example, when attemptCondReconfig-r16 in the RRC reconfiguration message is configured as true, it may be determined that information on the conditional reconfiguration (for example, information on the conditional handover) is included. Information on the conditional handover may include at least one of, for example, information on a candidate target cell (for example, identification information and bandwidth information), information for measuring whether an execution condition is satisfied (for example, frequency information and SCS information), or a parameter for configuring an execution condition (for example, Threshold rsrp or hyterisys value) for configuring specific event (for example, A2 event)) but there is no limitation.

In operation 421, the electronic device 101 may identify satisfaction of the conditional handover condition. For example, the electronic device 101 may identify (or consider) a cell having a physical cell identity (PCI) that matches a value determined by a conditional RRC reconfiguration (condRRCReconfig) for each conditional reconfiguration identifier (condReconfigId) within VarCondition-Reconfig. For a measurement ID (measId) within a measurement ID list (measIdList) in VarMeasConfig designated within the conditional execution condition (condExecutionCond) related to the conditional reconfiguration identifier (condReconfigId), if applicable conditions are satisfied for a cell to which the measurement result can be applied, the electronic device 101 may identify that an event associated with the measurement ID (measID) is fulfilled. If event(s) associated with measurement ID(s) (measID) within the conditional trigger configuration (condTrigger-Config) for a target candidate cell within the stored conditional RRC reconfiguration (condRRCReconfig) are fulfilled, the electronic device 101 may identify the target candidate cell within the conditional RRC reconfiguration (condRRCReconfig) associated with the corresponding conditional reconfiguration ID (condReconfigId) as a triggered cell. When one or more triggered cells exist, the electronic device 101 may select one of the triggered cells as a selected cell for execution of the conditional reconfiguration. The electronic device 101 may apply the conditional RRC reconfiguration (condRRCReconfig) of the selected cell and perform the corresponding operation. For example, the electronic device 101 may perform a conditional handover.

For example, when the target base station 402 is selected as the selected cell and it is determined to perform the conditional handover, the electronic device 101 may perform a random access (RA) procedure with the target base station 402 in operation 423. The electronic device 101 may acquire synchronization with the target base station 402 according to performance of the RA procedure. The electronic device 101 may transmit a target base station RRC reconfiguration completion message (for example, handover completion (HO complete) message) in operation 425 after the performance of the RA procedure. In operation 427, the electronic device 101 may complete the conditional handover.

However, when the handover is performed according to the performance of the handover based on whether only the conditional execution condition (condExecutionCond) within the RRC reconfiguration message is satisfied in operation 421, the handover may be performed under disadvantages or the handover may not be performed in a situation in which the handover should be performed early. The electronic device 101 according to various embodiments may determine whether to delay a handover time point when the conditional handover execution condition is satisfied, and may determine whether to perform the handover early when the conditional handover execution condition is not satisfied.

Figure 5:
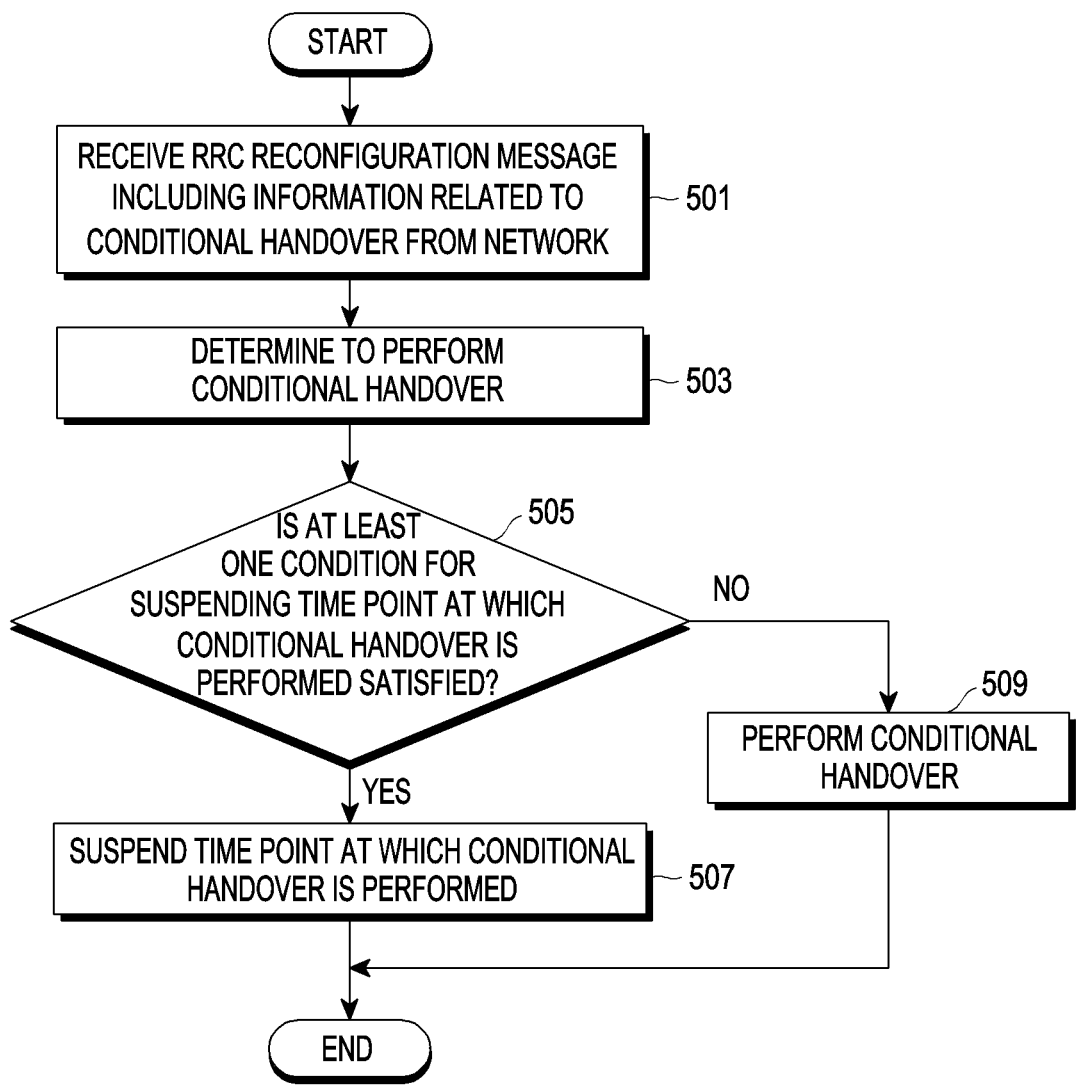
FIG. 5 is a flowchart illustrating a method of operating an electronic device according to an embodiment of the disclosure.

FIG. 5 is a flowchart illustrating a method of operating an electronic device according to an embodiment of the disclosure.

Referring to FIG. 5, the electronic device 101 (for example, at least one of the processor 120 of FIG. 1, the first communication processor 212 of FIG. 2A, the second communication processor 214 of FIG. 2A, or the integrated communication processor 260 of FIG. 2B) may receive an RRC reconfiguration message including information related to a conditional handover from a network (for example, serving cell) in operation 501. Although not illustrated, the electronic device 101 may perform measurement based on a measurement configuration included in another RRC reconfiguration message received from the network before operation 501 and perform a measurement report based on the measurement result. The network (for example, serving cell) may perform a handover preparation procedure for at least one target cell based on the received measurement report message. The network may transmit an RRC reconfiguration message including, for example, information related to the conditional handover, information on at least one candidate target cell, and a conditional handover execution condition to the electronic device 101.

According to various embodiments of the disclosure, the electronic device 101 may determine to perform the conditional handover in operation 503. For example, the electronic device 101 may perform measurement based on information related to the conditional handover included in the RRC reconfiguration message. The electronic device 101 may identify that the conditional handover execution condition for a specific target cell among candidate target cells is satisfied based on the measurement result. The electronic device 101 may determine to perform the conditional handover to a target cell corresponding to the satisfied conditional handover execution condition.

According to various embodiments of the disclosure, the electronic device 101 may determine whether at least one condition for postponing a time point at which the conditional handover is performed is satisfied in operation 505. For example, the electronic device 101 may determine whether the determined target cell is a cell which the electronic device 101 has accessed as the condition for postponing the time point at which the conditional handover is performed, and an embodiment therefor is described with reference to FIG. 7. For example, the electronic device 101 may determine whether an ultra-low latency service is being performed as the condition for postponing the time point at which the conditional handover is performed, and an embodiment therefor is described with reference to FIGS. 8A and 8B. For example, the electronic device 101 may determine whether a voice call operation is being performed as the condition for postponing the time point at which the conditional handover is performed, and an embodiment therefor is described with reference to FIGS. 9A and 9B. For example, the electronic device 101 may determine whether data transmission/reception is being performed as the condition for postponing the time point at which the conditional handover is performed, and an embodiment therefor is described with reference to FIGS. 10A and 10B.

According to various embodiments of the disclosure, the electronic device 101 may postpone the time point at which the conditional handover is performed in operation 507 based on satisfaction of at least one condition for postponing the time point at which the conditional handover is performed (operation 505—Yes). In various embodiments of the disclosure, suspension of the conditional handover may be suspension of a time point at which a random access request message (for example, request message or preamble) for the handover is transmitted. For example, the electronic device 101 may determine that at least one condition for postponing the time point at which the handover is performed is satisfied and transmit a random access request message to the target base station according to satisfaction of of an additional condition (for example, according to elapse of a predetermined time). As described above, it may be understood that the time point at which the handover is performed is suspended in the operation for postponing the time point at which the conditional handover is performed since the random access (RA) procedure is performed (for example, 423 of FIG. 4) after an additional determination operation compared to a general 4G/5G handover. In another example, the electronic device 101 may perform no operation at the time point at which the conditional handover is performed, refrain from performing the conditional handover, make a configuration (for example, flag value configuration) indicating that the time point at which the handover is performed is suspended, and/or run a timer for postponing the time point at which the handover is performed, but the disclosure is not limited thereto. Meanwhile, the operation for postponing the time point at which the conditional handover is performed may be the performance of a specific operation by the electronic device 101 but may be implemented by determining (deciding) the suspension of the performance time point or transmitting a command.

According to various embodiments of the disclosure, the electronic device 101 may postpone the conditional handover and then perform the conditional handover. For example, when satisfaction of at least one condition for stopping suspension is identified, the electronic device 101 may perform the suspended conditional handover, which may mean transmission of a random access channel (RACH) request message for the handover. At least one condition for stopping suspension corresponding to respective examples of at least one condition for stopping suspension may be configured, which will be described when the respective examples of at least one condition for stopping suspension are described. For example, when it is identified that at least one condition for postponing the time point at which the conditional handover is performed is released, the electronic device 101 may perform the suspended conditional handover. For example, the electronic device 101 may perform the suspended conditional handover according to elapse of a predetermined time and there is no limitation on trigger for performing the suspended conditional handover. The electronic device 101 may perform the conditional handover in operation 509 based on non-satisfaction of at least one condition for postponing the time point at which the conditional handover is performed (operation 505-No).

Figure 6A:
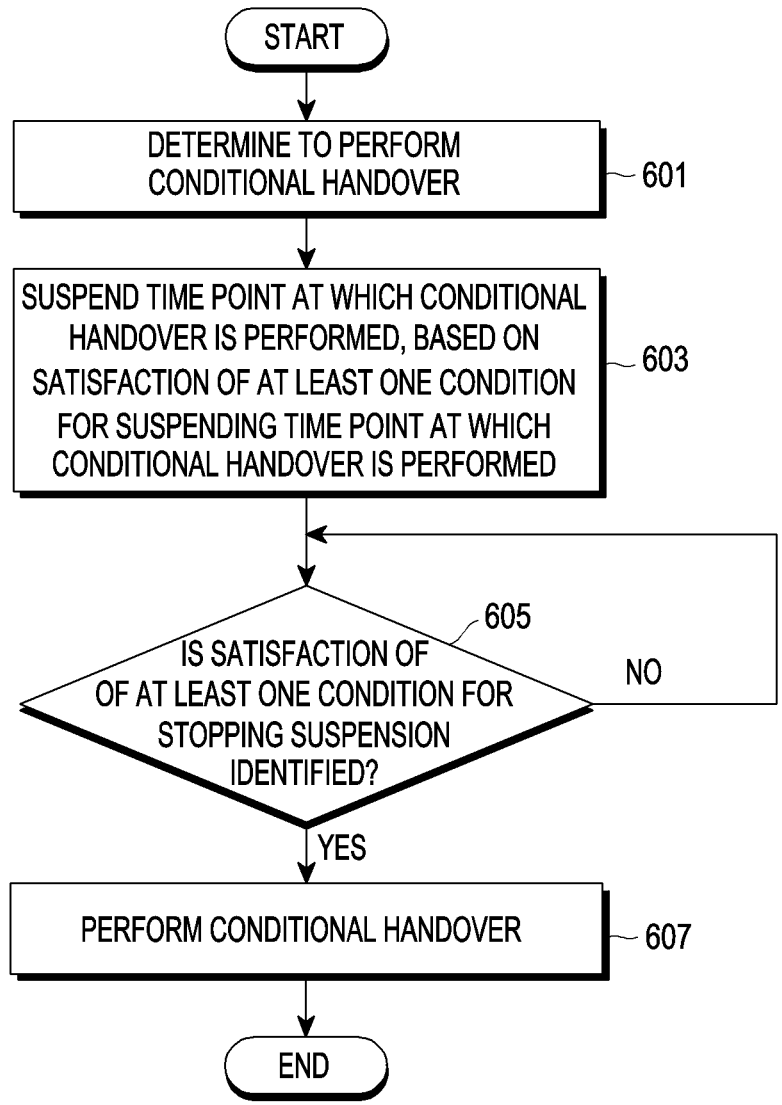
FIG. 6A is a flowchart illustrating a method of operating an electronic device according to an embodiment of the disclosure.

FIG. 6A is a flowchart illustrating a method of operating an electronic device according to an embodiment of the disclosure.

Referring to FIG. 6A, the electronic device 101 (for example, at least one of the processor 120, the first communication processor 212, the second communication processor 214, or the integrated communication processor 260) may determine to perform the conditional handover in operation 601. For example, the electronic device 101 may postpone the time point at which the conditional handover is performed based on identification of satisfaction of a conditional handover execution condition corresponding to a specific target cell according to information related to the conditional handover and the measurement result included in an RRC reconfiguration message received before operation 601. In operation 603, the electronic device 101 may identify that at least one condition for postponing the time point at which the conditional handover is performed is satisfied. As described above, postponing the time point at which the conditional handover is performed may mean postponing a time point at which a RACH request message for the handover is transmitted, and various examples of at least one condition are described with reference to FIGS. 7, 8A, 8B, 9A, 9B, 10A, and 10B.

According to various embodiments of the disclosure, when it is determined to postpone the time point at which the conditional handover is performed, the electronic device 101 may identify whether at least one condition for stopping suspension is satisfied in operation 605. At least one condition for stopping suspension may correspond to, for example, at least one condition for postponing the time point at which the conditional handover is performed. Various examples of at least one condition for stopping suspension are described with reference to FIGS. 7, 8A, 8B, 9A, 9B, 10A, and 10B. When at least one condition for stopping suspension is not satisfied (operation 605-No), the electronic device 101 may maintain suspension of the conditional handover. When at least one condition for stopping suspension is satisfied (operation 605—Yes), the electronic device 101 may perform the conditional handover to the target cell determined in operation 601 in operation 607.

In various embodiments of the disclosure, the electronic device 101 may postpone a conditional PSCell change instead of the operation for suspending the conditional handover. For example, when an execution condition for the conditional PSCell change is satisfied, the electronic device 101 may determine whether at least one condition for postponing a time point at which the PSCell change is made is satisfied. When the condition for suspension is satisfied, the electronic device 101 may postpone the time point at which the PSCell change is made. When the condition for suspension is not satisfied, the electronic device 101 may make the PSCell change. In various embodiments of the disclosure, the "execution condition for the conditional handover" may be replaced with the "execution condition for the conditional PSCell change", the "condition for suspending the conditional handover" may be replaced with the "condition for suspending the conditional PSCell change", the suspension of the conditional handover" may be replaced with the "suspension of the conditional PSCell change", and "stopping suspension of the conditional handover" may be replaced with "stopping suspension of the conditional PSCell change".

Figure 6B:
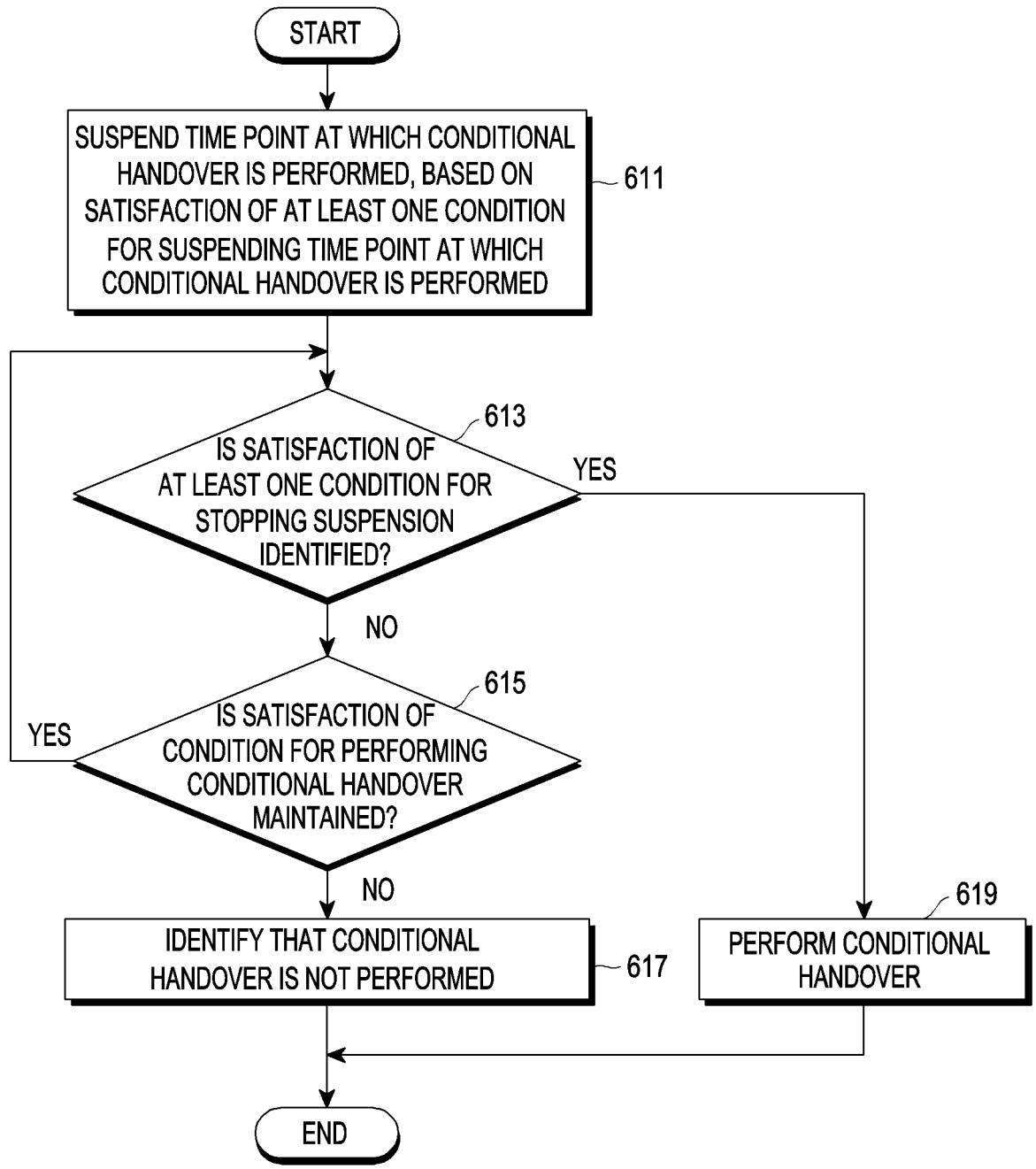
FIG. 6B is a flowchart illustrating a method of operating an electronic device according to an embodiment of the disclosure.
Figure 6C:
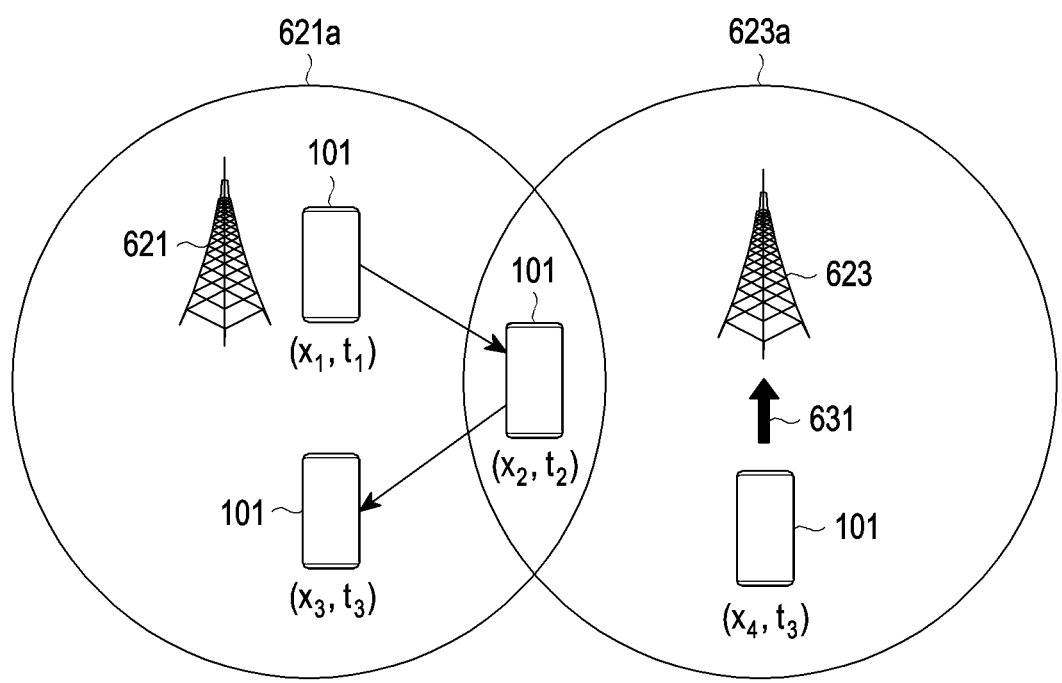
FIG. 6C illustrates movement of an electronic device between cells according to an embodiment of the disclosure.

FIG. 6B is a flowchart illustrating a method of operating an electronic device according to an embodiment of the disclosure. The embodiment of FIG. 6B is described with reference to FIG. 6C. FIG. 6C illustrates movement of an electronic device between cells according to an embodiment of the disclosure.

Referring to FIG. 6B, the electronic device 101 (for example, at least one of the processor 120 of FIG. 1, the first communication processor 212 of FIG. 2A, the second communication processor 214 of FIG. 2A, or the integrated communication processor 260 of FIG. 2B) may postpone the time point at which the conditional handover is performed based on satisfaction of at least one condition for postponing the time point at which the conditional handover is performed in operation 611. For example, the electronic device 101 may postpone the time point at which the RACH request message for the handover is transmitted. In the embodiment of FIG. 6B, it is assumed that, after the electronic device 101 identifies satisfaction of the conditional handover execution condition, it is additionally identified that at least one condition for postponing the time point at which the conditional handover is performed is satisfied.

Referring to FIG. 6C, it is assumed that the electronic device 101 may be located at a first position x1 within first coverage 621a of a first base station 621 at a first time point t1 and accesses the first base station 621. The electronic device 101 may receive an RRC reconfiguration message including the conditional handover execution condition corresponding to a second base station 623 from the first base station 621. The electronic device 101 may move to a second position x2 within an overlapping area between the first coverage 621a of the first base station 621 and second coverage 623a of the second base station 623 at a second time point t2. The electronic device 101 may identify that the conditional handover execution condition corresponding to the second base station 623 is satisfied at the second position x2. The electronic device 101 may determine whether at least one condition for postponing the time point at which the handover is performed is satisfied without immediately performing the handover to the second base station 623. In the embodiments of FIGS. 6B and 6C, it is assumed that the electronic device 101 determines that at least one condition for postponing the time point at which the handover to the second base station 623 is performed in the second position x2 and at the second time point t2. Accordingly, the electronic device 101 may postpone the time point at which the conditional handover is performed. For example, as the operation for postponing the time point at which the conditional handover is performed, the electronic device 101 may determine that at least one condition for postponing the time point at which the handover is performed is satisfied and transmit a random access request message to the target base station according to satisfaction of an additional condition (for example, according to elapse of a predetermined time). As described above, it may be understood that the time point at which the handover is performed is suspended in the operation for postponing the time point at which the conditional handover is performed since the random access (RA) procedure is performed (for example, 423 of FIG. 4) after an additional determination operation compared to a general 4G/5G handover. In another example, the electronic device may perform no operation at the time point at which the conditional handover is performed, refrain from performing the conditional handover, make a configuration (for example, flag value configuration) indicating that the time point at which the handover is performed is suspended, and/or run a timer for postponing the time point at which the handover is performed, but the disclosure is not limited thereto. Meanwhile, the operation for postponing the time point at which the conditional handover is performed may be a specific operation performed by the electronic device 101 but may be implemented by determining (deciding) suspension of the performance time point or transmitting a command.

According to various embodiments of the disclosure, the electronic device 101 may identify whether at least one condition for topping suspension is satisfied in operation 613. For example, "stopping suspension" may be interpreted as "determining or deciding suspension or cancelling a command". When at least one condition for stopping suspension is satisfied (operation 613—Yes), the electronic device 101 may perform the handover to the second base station 623 in operation 619. For example, as illustrated in FIG. 6C, the electronic device 101 may move to a fourth time point x4 at a third time point t3. The fourth time point x4 may be inside the second coverage 623a of the second base station 623. The electronic device 101 may determine whether satisfaction of the handover execution condition corresponding to the second base station 623 is maintained while continuing measurement of a signal from the second base station 623. The electronic device 101 may identify that the handover execution condition corresponding to the second base station 623 is continuously satisfied in the fourth position x4. In this case, the electronic device 101 may perform the handover by transmitting a RACH preamble 631 for the handover.

According to various embodiments of the disclosure, when at least one condition for stopping suspension is not satisfied (operation 613-No), the electronic device 101 may identify whether satisfaction of the conditional handover execution condition is maintained in operation 615. When satisfaction of the conditional handover execution condition is maintained (operation 615—Yes), the electronic device 101 may monitor whether at least one condition for stopping suspension is satisfied while maintaining suspension of the conditional handover. When satisfaction of the conditional handover execution condition is not maintained (operation 615-No), the electronic device 101 may identify that the conditional handover is not performed in operation 617. For example, the electronic device 101 may move to the third position x3 at the third time point t3. The third position x3 may be inside the first coverage 621a of the first base station 621 and may be outside the second coverage 623a of the second base station 623. The electronic device 101 may determine whether satisfaction of the handover execution condition corresponding to the second base station 623 is maintained while continuing measurement of a signal from the second base station 623. The electronic device 101 may identify that the handover execution condition corresponding to the second base station 623 is not satisfied any more in the third position x3. In this case, the electronic device 101 may stop suspending the conditional handover to the second base station 623 and determine not to perform the handover to the second base station 623.

Figure 6D:
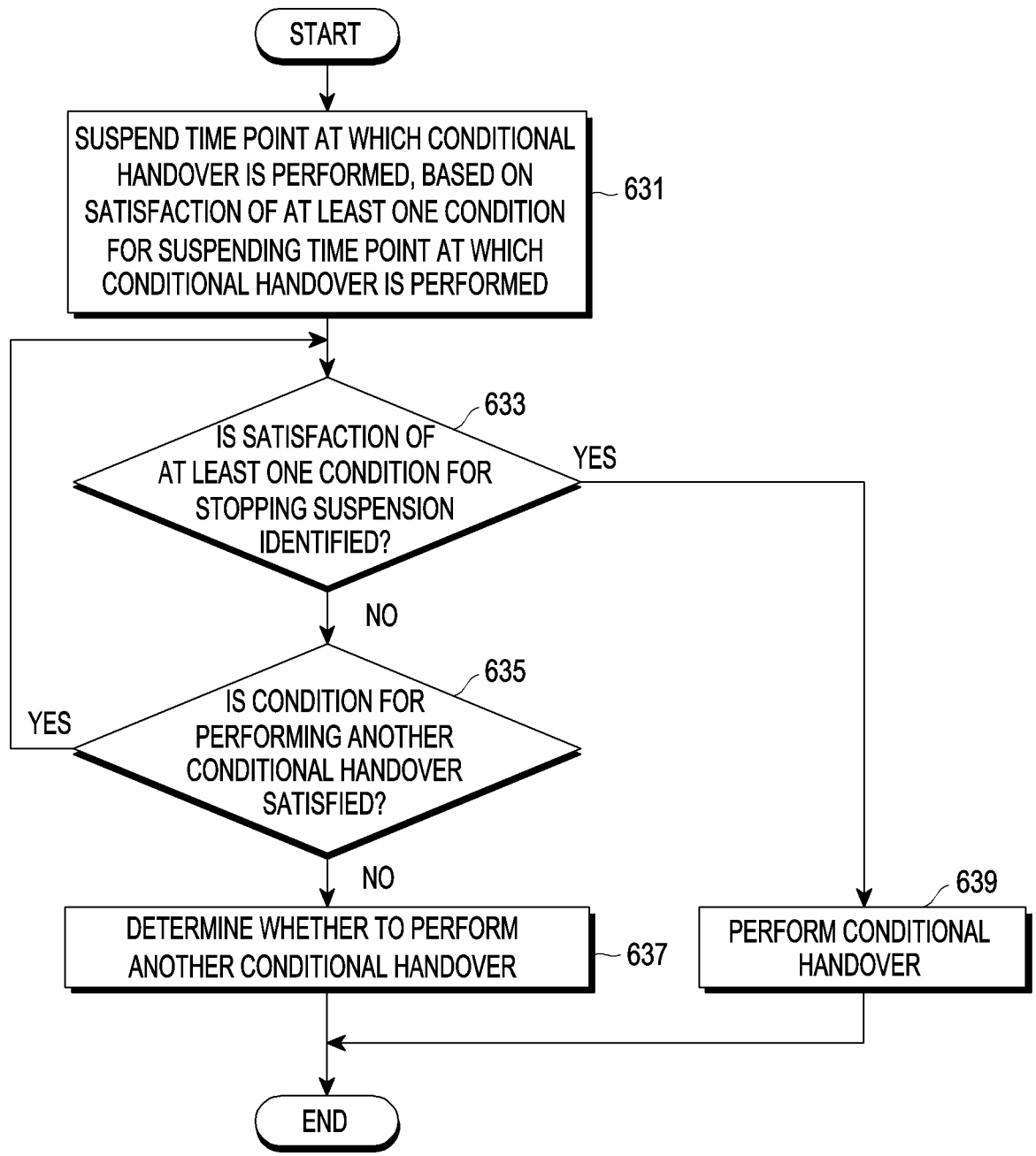
FIG. 6D is a flowchart illustrating a method of operating an electronic device according to an embodiment of the disclosure.
Figure 6E:
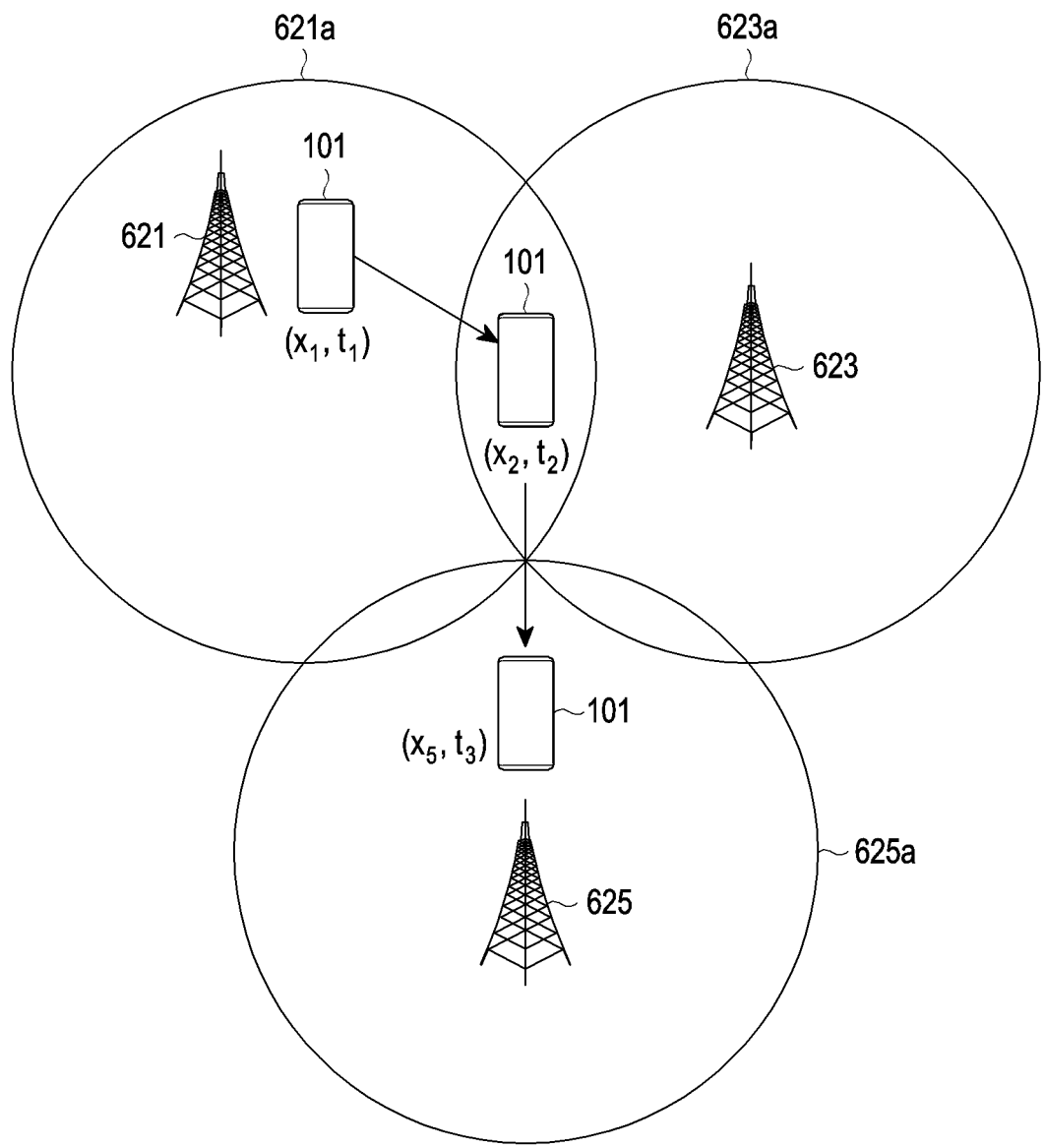
FIG. 6E illustrates movement of an electronic device between cells according an embodiment of the disclosure.

FIG. 6D is a flowchart illustrating a method of operating an electronic device according to an embodiment of the disclosure. The embodiment of FIG. 6D is described with reference to FIG. 6E. FIG. 6E illustrates movement of an electronic device between cells according an embodiment of the disclosure.

According to various embodiments of the disclosure, the electronic device 101 (for example, at least one of the processor 120 of FIG. 1, the first communication processor 212 of FIG. 2A, the second communication processor 214 of FIG. 2A, or the integrated communication processor 260 of FIG. 2B) may postpone the time point at which the conditional handover is performed based on satisfaction of at least one condition for postponing the time point at which the conditional handover is performed in operation 631.

Referring to FIG. 6D, it is assumed that the electronic device 101 additionally identifies satisfaction of at least one condition for postponing the time point at which the conditional handover is performed after identifying satisfaction of the conditional handover execution condition. Accordingly, the electronic device 101 may postpone the time point at which the conditional handover is performed, for example, the time point at which the RACH request message for the handover is transmitted.

Referring to FIG. 6E, it is assumed that the electronic device 101 may be located in the first position x1 within the first coverage 621a of the first base station 621 at the first time point t1 and accesses the first base station 621. The electronic device 101 may receive an RRC reconfiguration message including the conditional handover execution condition corresponding to the second base station 623 and the conditional handover execution condition corresponding to a third base station 625 from the first base station 621. The electronic device 101 may move to a second position x2 within an overlapping area between the first coverage 621a of the first base station 621 and second coverage 623a of the second base station 623 at a second time point t2. The electronic device 101 may identify that the conditional handover execution condition corresponding to the second base station 623 is satisfied at the second position x2. The electronic device 101 may determine whether at least one condition for postponing the time point at which the handover is performed is satisfied without immediately performing the handover to the second base station 623. In the embodiments of FIGS. 6D and 6E, it is assumed that satisfaction of at least one condition for postponing the time point at which the handover to the second base station 623 is performed is identified in the second position x2 and at the second time point t2. Accordingly, the electronic device 101 may postpone the time point at which the conditional handover is performed, for example, the time point at which the RACH request message for the handover is transmitted.

According to various embodiments of the disclosure, the electronic device 101 may identify whether at least one condition for topping suspension is satisfied in operation 633. When at least one condition for stopping suspension is satisfied (operation 633—Yes), the electronic device 101 may perform the handover to the second base station 623 in operation 639. When at least one condition for stopping suspension is not satisfied (operation 633-No), the electronic device 101 may determine whether another conditional handover execution condition is satisfied in operation 635. When another conditional handover execution condition is not satisfied (operation 635-No), the electronic device 101 may monitor whether at least one condition for stopping suspension is satisfied while maintaining suspension of the conditional handover. When another conditional handover execution condition is satisfied (operation 635—Yes), the electronic device 101 may determine whether to perform another conditional handover in operation 637. For example, the electronic device 101 may move to a fifth position x5 at the third time point t3. The fifth position x5 may be inside the first coverage 621a of the first base station 621, may be outside the second coverage 623a of the second base station 623, and may be inside the third coverage 625a. The electronic device 101 may determine whether the handover execution condition corresponding to the third base station 625 is satisfied based on measurement of a signal from the third base station 625. The electronic device 101 may identify that the handover execution condition corresponding to the third base station 625 is satisfied in the fifth position x5. In this case, the electronic device 101 may determine whether to perform the conditional handover to the third base station 623. For example, for the third base station 623, the electronic device 101 may determine whether to postpone the time point at which the conditional handover is performed or immediately perform the conditional handover. In this case, the electronic device 101 may remove information on the suspended conditional handover to the second base station 623 or maintain monitoring about whether to stop suspending the conditional handover to the second base station 623. The electronic device 101 may identify that the execution condition of the conditional handover to the second base station 623 in the fifth position x5 is not satisfied anymore and remove information related to the conditional handover to the second base station 623 according thereto.

Figure 7:
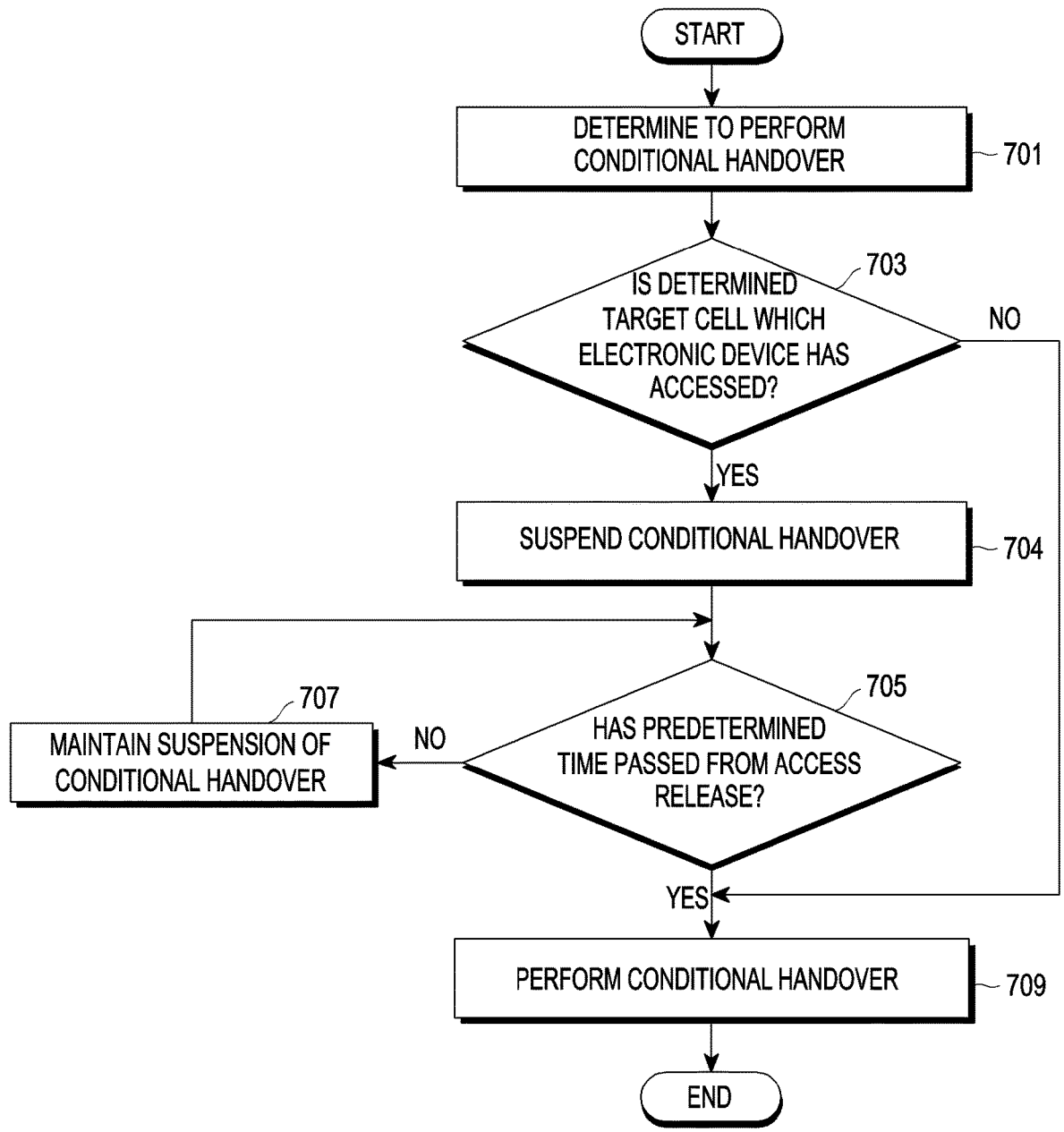
FIG. 7 is a flowchart illustrating a method of operating an electronic device according to an embodiment of the disclosure.

FIG. 7 is a flowchart illustrating a method of operating an electronic device according to an embodiment of the disclosure.

Referring to FIG. 7, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine to perform the conditional handover in operation 701. In operation 703, the electronic device 101 may determine whether the determined target cell is a cell which the electronic device 101 has accessed as a condition for postponing the time point at which the handover is performed. For example, the electronic device 101 may store information related to the accessed cell. The electronic device 101 may store information for identifying the accessed cell (for example, PCI and ARFCN) and information related to an access time (for example, a time point at which access starts and a time point at which access is released). Further, the electronic device 101 may identify information on a target cell that satisfies the conditional handover execution condition from information on candidate target cells received from a serving cell. Accordingly, the electronic device 101 may determine whether information on the target cell that satisfies the conditional handover execution condition is included in a list of cells which the electronic device 101 has accessed.

According to various embodiments of the disclosure, when it is identified that the target cell is the cell which the electronic device 101 has accessed (operation 703—Yes), the electronic device 101 may suspend the conditional handover, for example, the time point at which the RACH request message for the handover is transmitted in operation 704. The electronic device 101 may determine whether a predetermined time (for example, 10 seconds) passes from release of the access as the condition for stopping suspension in operation 705. The predetermined time is a time after which a ping-pong phenomenon can be alleviated, but there is no limitation on a value thereof. As described above, the electronic device 101 may manage information related to an access time of the accessed cell, for example, a time point at which access is released. For example, the electronic device 101 may identify a difference between a time point at which the conditional handover execution condition corresponding to the target cell is satisfied and a time point at which the access is released from the target cell, and determine whether the identified time is longer than or equal to a predetermined time. When it is identified that the predetermined time does not pass from release of the access (operation 705-No), the electronic device 101 may maintain suspension of the conditional handover in operation 707. Alternatively, the electronic device 101 may re-suspend the conditional handover. The electronic device 101 may determine whether a predetermined time passes from release of the access again in operation 705. When the predetermined time passes from release of the access (operation 705—Yes), the electronic device 101 may perform the conditional handover in operation 709.

When the electronic device 101 is located in an overlapping area between the serving cell and the target cell and the handover to the target cell is performed without elapse of a predetermined time as illustrated in FIG. 7, a possibility of the ping-pong phenomenon in which the handover from the serving cell to the target cell or the handover from the target cell to the serving cell is repeated is high. A time that maintains the possibility of the ping-pong phenomenon to be equal to or lower than a threshold value may be configured as a standby time of re-access to the target cell after the conditional handover execution condition, but there is no limitation.

Meanwhile, as illustrated in FIG. 6B, when satisfaction of the conditional handover execution condition is not maintained during waiting for the predetermined time for the re-access to the target cell, the electronic device 101 may not perform the handover to the target cell. Alternatively, as illustrated in FIG. 6D, when satisfaction of the conditional handover execution condition to another target cell is identified during waiting for the predetermined time for the re-access to the target cell, the electronic device 101 may determine whether to perform the handover to another target cell.

Figure 8A:
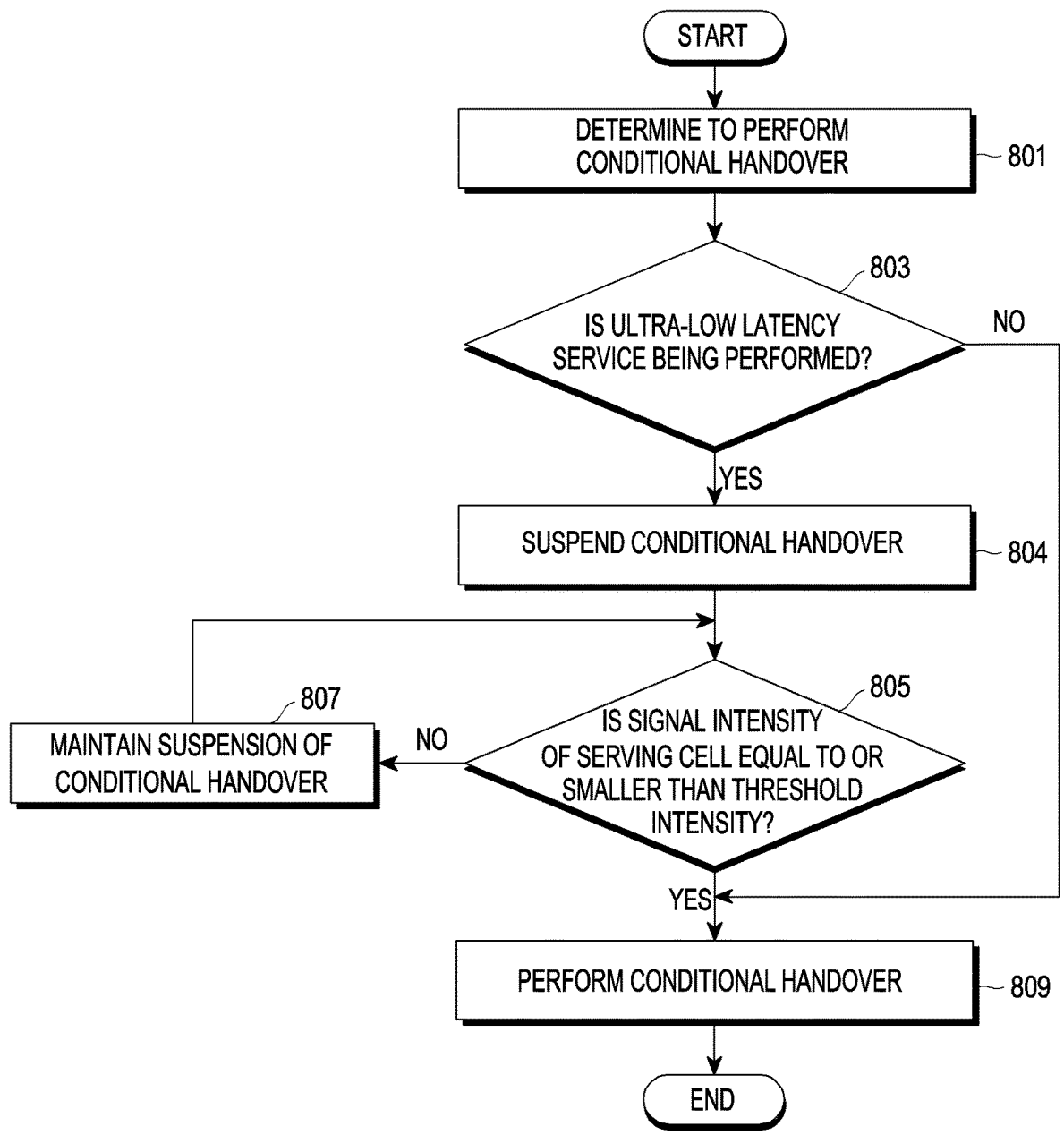
FIG. 8A is a flowchart illustrating a method of operating an electronic device according to an embodiment of the disclosure.

FIG. 8A is a flowchart illustrating a method of operating an electronic device according to an embodiment of the disclosure.

Referring to FIG. 8A, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine to perform the conditional handover in operation 801. In operation 803, the electronic device 101 may determine whether an ultra-low latency service is being performed as the condition for postponing the time point at which the handover is performed. When the handover is performed while the ultra-low latency service is performed, data transmission/reception for the ultra-low latency service may be delayed, and thus it may be preferable to delay the handover even though the conditional handover execution condition is satisfied when the ultra-low latency service is being performed. For example, when a resource type of a QoS ID (QI) is from QI 82 to QI 85 expressed by delay critical GBR, the electronic device 101 may identify that the ultra-low latency service is being performed. For example, in the case of QI 82 to QI 85, a packet delay budget may be configured as 5 to 30 ms, which may be identified as the ultra-low latency service. Alternatively, in another example, the electronic device 101 may identify whether the ultra-low latency service is being performed based on a slice service type (SST) and/or a data network name (DNN) and there is no limitation on an identification scheme.

According to various embodiments of the disclosure, when it is identified that the ultra-low latency service is being performed (operation 803—Yes), the electronic device 101 may suspend the conditional handover, for example, the time point at which the RACH request message for the handover is transmitted in operation 804. The electronic device 101 may determine whether a signal intensity of the serving cell is equal to or lower than a threshold intensity as the condition for stopping suspension in operation 805. The electronic device 101 may measure the intensity of a signal from the serving cell during suspension of the handover. When the intensity of the signal from the serving cell is larger than the threshold intensity (operation 805—No), the electronic device 101 may maintain suspension of the conditional handover in operation 807. Alternatively, the electronic device 101 may re-suspend the conditional handover. The electronic device 101 may determine whether the signal intensity of the serving cell is equal to or lower than the threshold intensity (for example, RSRP: −100 dBm) again in operation 805. When the signal intensity of the serving cell is equal to or lower than the threshold intensity (operation 805—Yes), the electronic device 101 may perform the conditional handover in operation 809. When the intensity of the signal from the serving cell is relatively good, the delay of the ultra-low latency service can be prevented even though the time point at which the handover is performed is postponed, but when the intensity of the signal from the serving cell is bad, the handover may be performed to prevent disconnection of communication rather than the delay of the ultra-low latency service. The threshold intensity configured in operation 805 may be configured as, for example, a threshold intensity of an A1 event for the handover, but there is no limitation and the threshold intensity may be higher or lower than the threshold intensity of the A1 event.

In various embodiments of the disclosure, when termination of the ultra-low latency service is identified while the handover is postponed by the signal intensity of the serving cell higher than or equal to the threshold intensity, the electronic device 101 may perform the handover to the target cell.

Meanwhile, as illustrated in FIG. 6B, when satisfaction of the conditional handover execution condition is not maintained while the handover is postponed by the signal intensity of the serving cell higher than or equal to the threshold intensity, the electronic device 101 may not perform the handover to the target cell. Alternatively, as illustrated in FIG. 6D, when satisfaction of the execution condition of the conditional handover to another target cell is identified while the handover is postponed by the signal intensity of the serving cell higher than or equal to the threshold intensity, the electronic device 101 may determine whether the handover to another target cell is performed.

Figure 8B:
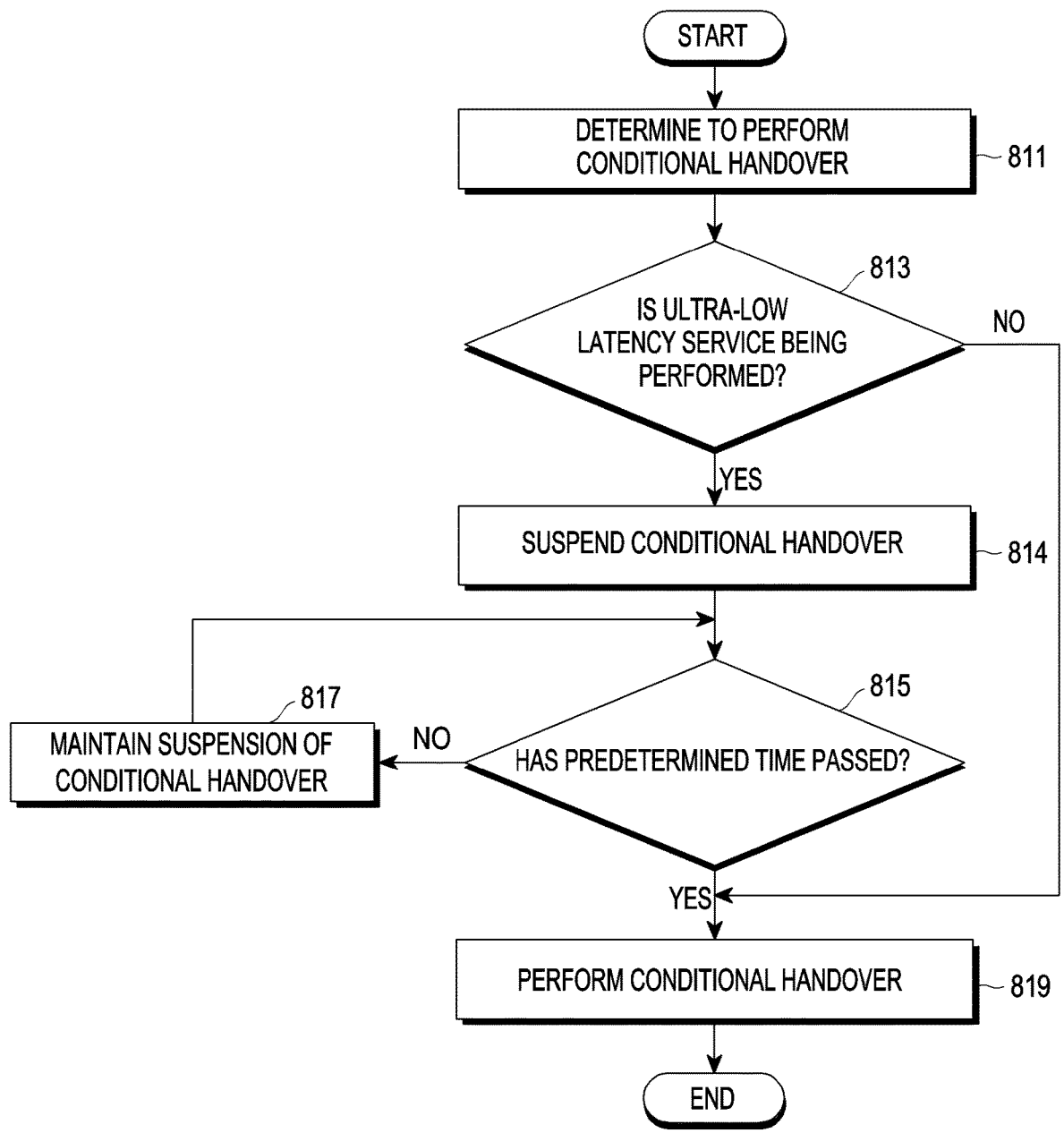
FIG. 8B is a flowchart illustrating a method of operating an electronic device according to an embodiment of the disclosure.

FIG. 8B is a flowchart illustrating a method of operating an electronic device according to an embodiment of the disclosure.

Referring to FIG. 8B, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine to perform the conditional handover in operation 811. In operation 813, the electronic device 101 may determine whether an ultra-low latency service is being performed as the condition for postponing the time point at which the handover is performed.

According to various embodiments of the disclosure, when it is identified that the ultra-low latency service is being performed (operation 813—Yes), the electronic device 101 may suspend the conditional handover, for example, the time point at which the RACH request message for the handover is transmitted in operation 814. In operation 815, the electronic device 101 may determine whether a predetermined time passes as the condition for stopping suspension. For example, the electronic device 101 may determine whether a predetermined time (for example, 1 second) passes from the time point at which data for the ultra-low latency service is transmitted or received. The predetermined time configured in operation 815 may be a time during which it is guaranteed that, for example, the ultra-low latency service is performed and data of the ultra-low latency service is not generated in the future, but there is no limitation. When the predetermined time does not pass (operation 815—No), the electronic device 101 may maintain suspension of the conditional handover in operation 817. Alternatively, the electronic device 101 may re-suspend the conditional handover. The electronic device 101 may determine whether the signal intensity of the serving cell is equal to or lower than the threshold intensity again in operation 815. When it is identified that the predetermined time passes (operation 815—Yes), the electronic device 101 may perform the conditional handover in operation 819.

Meanwhile, as illustrated in FIG. 6B, when satisfaction of the conditional handover execution condition is not maintained while the handover is suspended since the predetermined time does not pass, the electronic device 101 may not perform the handover to the target cell. Alternatively, when satisfaction of the execution condition of the conditional handover to another target cell is identified while the handover is suspended since the predetermined time does not pass, the electronic device 101 may determine whether the handover to another target cell is performed.

Figure 9A:
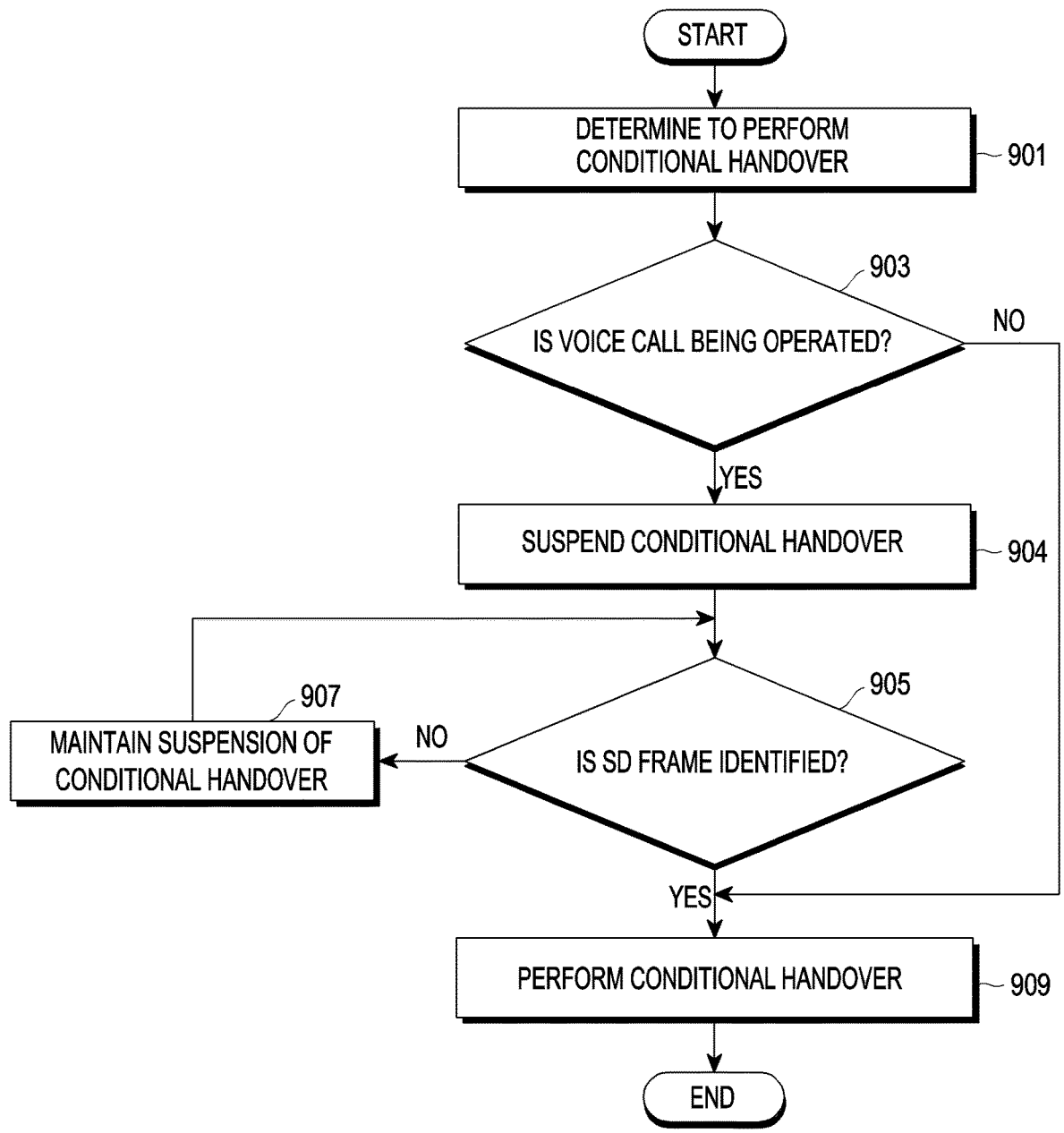
FIG. 9A is a flowchart illustrating a method of operating an electronic device according to an embodiment of the disclosure.
Figure 9B:
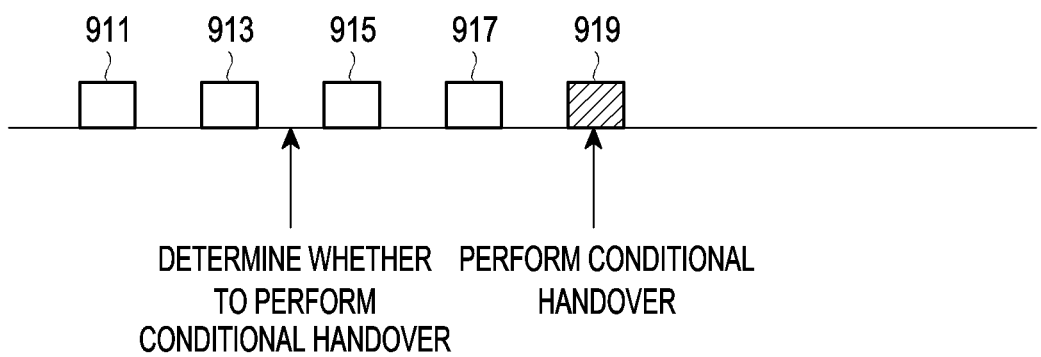
FIG. 9B illustrates a data frame during execution of a voice call according to an embodiment of the disclosure.

FIG. 9A is a flowchart illustrating a method of operating an electronic device according to an embodiment of the disclosure. The embodiment of FIG. 9A will be described with reference to FIG. 9B. FIG. 9B illustrates a data frame during execution of a voice call according to an embodiment of the disclosure.

Referring to FIG. 9A, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine to perform the conditional handover in operation 901. In operation 903, the electronic device 101 may determine whether a voice call is performed as the condition for postponing the time point at which the handover is performed. When the handover is performed while the voice call is performed, a voice of the voice call can be disconnected, and thus it may be preferable to suspend the handover even through the conditional handover execution condition is satisfied when the voice call is being performed and data for a phone call is being transmitted and received. For example, the electronic device 101 may transmit and receive a frame while the voice call is performed. Referring to FIG. 9B, the electronic device 101 may transmit frames 911, 913, 915, and 917 corresponding to voice data. The electronic device 101 may identify that no voice is generated while the voice call is performed. When a real-time transport protocol (RTP) payload format is used, the electronic device 101 may be configured to transmit a silence descriptor (SID) frame 919 during a silent period, for example, every 160 ms.

According to various embodiments of the disclosure, when it is identified that the voice call is being performed (operation 903—Yes), the electronic device 101 may suspend the conditional handover, for example, the time point at which the RACH request message for the handover is transmitted in operation 904. The electronic device 101 may determine whether the SID frame is identified as the condition for stopping suspension in operation 905. The electronic device 101 may monitor a type of a frame associated with the voice call while the handover is suspended. When the SID frame is not identified (operation 905-No), the electronic device 101 may maintain suspension of the conditional handover in operation 907. Alternatively, the electronic device 101 may re-suspend the conditional handover. The electronic device 101 may determine whether the SID frame is identified in operation 905 again. For example, referring to FIG. 9B, the electronic device 101 may determine that the conditional handover will be performed after the frame 913 corresponding to voice data is generated. Thereafter, the electronic device 101 may identify frames 915 and 917 corresponding to voice data and suspend the conditional handover based on failure of identification of the SID frame. When the SID frame is identified (operation 905—Yes), the electronic device 101 may perform the conditional handover in operation 909. For example, in FIG. 9B, the electronic device 101 may perform the conditional handover based on identification of the SID frame 919.

In various embodiments of the disclosure, when the end of the voice call is identified while the handover is suspended due to failure of identification of the SID frame during the voice call, the electronic device 101 may perform the handover to the target cell.

Meanwhile, as illustrated in FIG. 6B, when satisfaction of the conditional handover execution condition is not maintained while the handover is suspended due to failure of identification of the SID frame during the voice call, the electronic device 101 may not perform the handover to the target cell. Alternatively, as illustrated in FIG. 6D, when satisfaction of the execution condition of the conditional handover to another target cell is identified while the handover is suspended due to failure of identification of the SID frame during the voice call, the electronic device 101 may determine whether the handover to another target cell is performed.

Figure 10A:
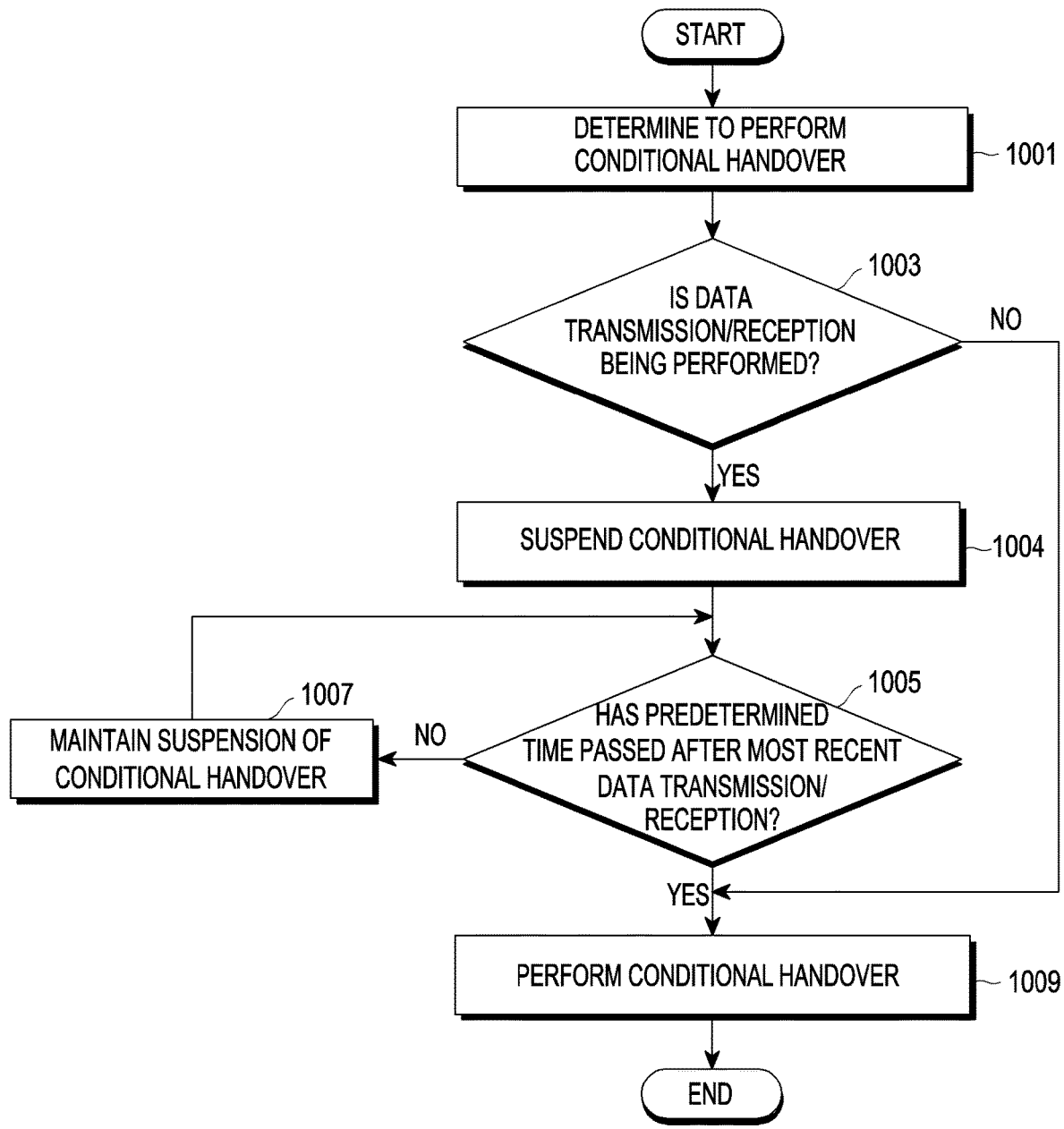
FIG. 10A is a flowchart illustrating a method of operating an electronic device according to an embodiment of the disclosure.

FIG. 10A is a flowchart illustrating a method of operating an electronic device according to an embodiment of the disclosure. The embodiment of FIG. 10A will be described with reference to FIG. 10B.

Figure 10B:
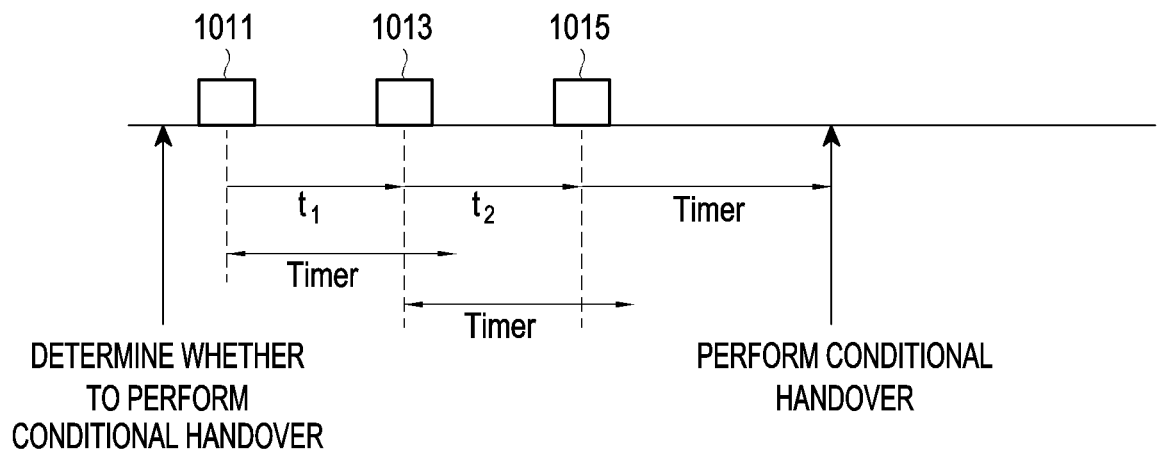
FIG. 10B illustrates a monitoring result of a physical downlink control channel (PDCCH) according to an embodiment of the disclosure.

FIG. 10B illustrates a monitoring result of a PDCCH according to an embodiment of the disclosure.

Referring to FIG. 10A, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine to perform the conditional handover in operation 1001. In operation 1003, the electronic device 101 may determine whether data transmission/reception is being performed as the condition for postponing the time point at which the handover is performed. For example, when a UL grant or a DL grant is identified based on a physical downlink control channel (PDCCH), the electronic device 101 may identify that data transmission/reception is being performed but there is no limitation on a scheme for identifying whether data transmission/reception is being performed. When data transmission/reception is being performed, the data transmission/reception can be disconnected, and thus it may be preferable to suspend the handover even though the conditional handover execution condition is satisfied when the data transmission/reception is being performed.

Referring to FIG. 10B, when the electronic device 101 is performing data transmission/reception, UL grants or DL grants 1011, 1013, and 1015 may be identified as the PDCCH monitoring result. Monitoring the UL grants or DL grants 1011, 1013, and 1015 may mean that there is data to be transmitted or received by the electronic device 101.

According to various embodiments of the disclosure, when data transmission/reception is being performed (operation 1003—Yes), the electronic device 101 may suspend the conditional handover, for example, the time point at which the RACH request message for the handover is transmitted in operation 1004. In operation 1005, the electronic device 101 may determine whether a predetermined time passes after the most recent data transmission/reception as the condition for stopping suspension. The electronic device 101 may monitor a PDCCH while the handover is suspended. When the predetermined time does not pass after the most recent data transmission/reception (operation 1005—No), the electronic device 101 may maintain suspension of the conditional handover in operation 1007. Alternatively, the electronic device 101 may re-suspend the conditional handover, for example, suspend the time point at which the RACH request message for the handover is transmitted. The electronic device 101 may determine whether the predetermined time passes after the most recent data transmission/reception in operation 1005 again. For example, referring to FIG. 10B, after determining to perform the conditional handover, the electronic device 101 may identify that the grant is not generated based on the PDCCH monitoring result during t1 after the UL or DL grant 1011 is generated. However, since a period of t1 is shorter than a predetermined time (for example, timer of FIG. 10B), the electronic device 101 may maintain suspension of the conditional handover. The electronic device 101 may identify that the grant is not generated based on the PDCCH monitoring result during t2 after the UL or DL grant 1013 is generated. However, since a period of t2 is shorter than a predetermined time (for example, timer of FIG. 10B), the electronic device 101 may maintain suspension of the conditional handover.

According to various embodiments of the disclosure, when the predetermined time passes after the most recent data transmission/reception (operation 1005—Yes), the electronic device 101 may perform the conditional handover in operation 1009. For example, in FIG. 10B, it may be identified that no grant is generated based on the PDCCH monitoring result during a predetermined time (for example, timer of FIG. 10B) after the UL or DL grant 1015 is generated. Accordingly, the electronic device 101 may perform the conditional handover. In the example of FIG. 10B, the timer corresponding to the predetermined time may be a DRX inactivity timer configured in, for example, 3GPP TS 36.321, but there is no limitation on an expiration time thereof.

Meanwhile, as illustrated in FIG. 6B, when satisfaction of the conditional handover execution condition is not maintained while the handover is suspended since the predetermined time does not pass after the most recent data transmission/reception, the electronic device 101 may not perform the handover to the target cell. Alternatively, as illustrated in FIG. 6D, when satisfaction of the execution condition of the conditional handover to another target cell is identified while the handover is suspended since the predetermined time does not pass after the most recent data transmission/reception, the electronic device 101 may determine whether the handover to another target cell is performed.

Figure 11:
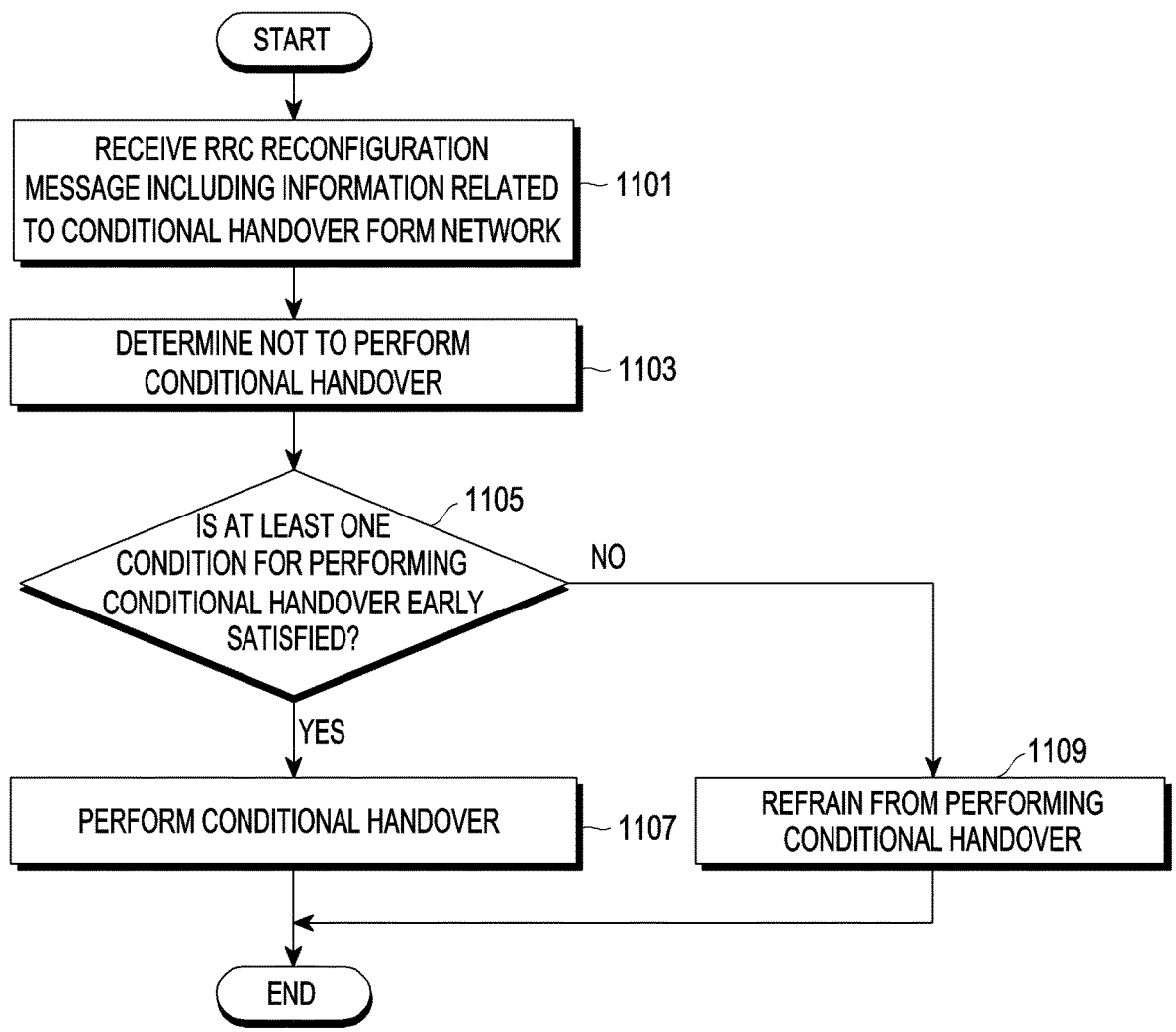
FIG. 11 is a flowchart illustrating a method of operating an electronic device according to an embodiment of the disclosure.

FIG. 11 is a flowchart illustrating a method of operating an electronic device according to an embodiment of the disclosure.

Referring to FIG. 11, the electronic device 101 (for example, at least one of the processor 120 of FIG. 1, the first communication processor 212 of FIG. 2A, the second communication processor 214 of FIG. 2A, or the integrated communication processor 260 of FIG. 2B) may receive an RRC reconfiguration message including information related to a conditional handover from a network (for example, serving cell) in operation 1101. Although not illustrated, the electronic device 101 may perform measurement based on a measurement configuration included in another RRC reconfiguration message received from the network before operation 1101 and perform a measurement report based on the measurement result. The network (for example, serving cell) may perform a handover preparation procedure for at least one target cell based on the received measurement report message. The network may transmit an RRC reconfiguration message including information related to the conditional handover, for example, information on at least one candidate target cell and the conditional handover execution condition to the electronic device 101.

According to various embodiments of the disclosure, the electronic device 101 may determine not to perform the conditional handover in operation 1103. For example, when attemptCondReconfig-r16 within the RRC reconfiguration message is configured as true, the electronic device 101 may determine whether the execution condition of the periodic or aperiodic conditional handover is satisfied. The electronic device 101 may identify that the conditional handover execution condition is not satisfied.

According to various embodiments of the disclosure, the electronic device 101 may determine whether at least one condition for performing the conditional handover early is satisfied in operation 1105 based on determination that the conditional handover is not performed. For example, the electronic device 101 may determine whether a difference between the signal intensity of the target cell and the signal intensity of the serving cell is larger than or equal to a threshold value as the condition for performing the conditional handover early, and an embodiment therefor is described with reference to FIGS. 12A and 12B. For example, the electronic device 101 may determine whether a bandwidth of the target cell is larger than a bandwidth of the serving cell as the condition for performing the conditional handover early, and an embodiment therefor is described with reference to FIGS. 13A and 13B. For example, the electronic device 101 may determine whether a block error rate (BLER) is larger than or equal to a threshold BLER as the condition for performing the conditional handover early, and an embodiment therefor is described with reference to FIG. 14. For example, the electronic device 101 may determine whether a parameter related to RLF satisfies a predetermined condition as the condition for performing the conditional handover early, and an embodiment therefor is described with reference to FIG. 15.

According to various embodiments of the disclosure, the electronic device 101 may perform the conditional handover in operation 1107 based on satisfaction of at least one condition for performing the conditional handover early (operation 1105—Yes). Although the conditional handover execution condition is not satisfied, the electronic device 101 may be configured to perform the conditional handover when the early performance has an actual profit. The electronic device 101 may refrain from performing the conditional handover in operation 1109 based on non-satisfaction of at least one condition for performing the conditional handover early (operation 1105—No). The electronic device 101 may determine whether the next period passes and the condition handover execution condition is satisfied again.

In various embodiments of the disclosure, the electronic device 101 may perform a conditional PSCell change early instead of the operation for performing the conditional handover early. For example, when the execution condition for the conditional PSCell change is not satisfied, the electronic device 101 may determine whether at least one condition for making the time point at which the PSCell change is made earlier is satisfied. When the condition for the early performance is satisfied, the electronic device 101 may make the PSCell change. When the condition for the early performance is not satisfied, the electronic device 101 may refrain from making the PSCell change. In various embodiments of the disclosure, the "conditional handover execution condition" may be replaced with the "execution condition for the conditional PSCell change", the "condition for performing the conditional handover early" may be replaced with the "condition for making the conditional PSCell change early", and the "early performance of the conditional handover" may be replaced with the "early performance of the conditional PSCell change".

Figure 12A:
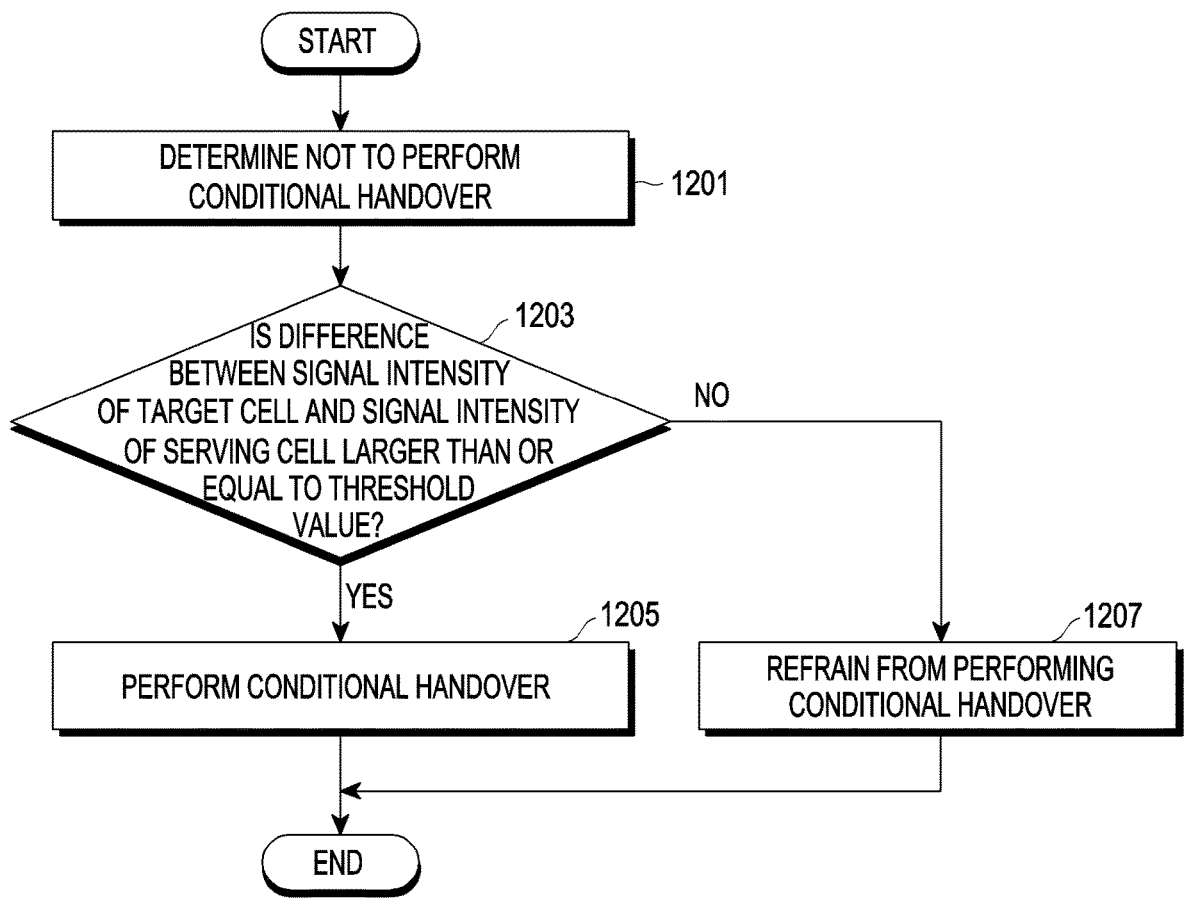
FIG. 12A is a flowchart illustrating a method of operating an electronic device according to an embodiment of the disclosure.

FIG. 12A is a flowchart illustrating a method of operating an electronic device according to an embodiment of the disclosure. The embodiment of FIG. 12A will be described with reference to FIG. 12B.

Figure 12B:
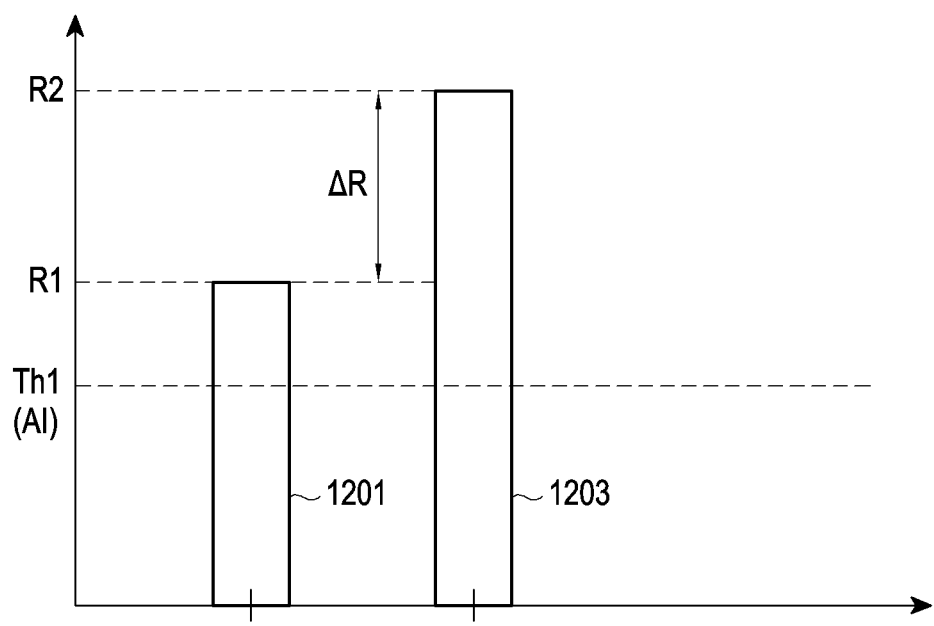
FIG. 12B illustrates a signal intensity of a serving cell and a signal intensity of a target cell according to an embodiment of the disclosure.

FIG. 12B illustrates a signal intensity of a serving cell and a signal intensity of a target cell according to an embodiment of the disclosure.

Referring to FIG. 12A, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine not to perform the conditional handover in operation 1201. For example, the electronic device 101 may identify that the conditional handover execution condition within the RRC reconfiguration message is not satisfied.

According to various embodiments of the disclosure, the electronic device 101 may determine whether a difference between the signal intensity of the target cell and the signal intensity of the serving cell is larger than or equal to a threshold value as at least one condition for performing the condition handover early in operation 1203.

Referring to FIG. 12B, the electronic device 101 may identify that the signal intensity 1201 of the serving cell is R1 and the signal intensity 1203 of the target cell is R2. The electronic device 101 may determine whether a difference ΔR between R2 corresponding to the signal intensity 1203 of the target cell and R1 corresponding to the signal intensity 1201 is larger than or equal to a threshold value. For example, the threshold value may be a threshold value configured in an A3 event or may be smaller or larger than the threshold value.

According to various embodiments of the disclosure, when the difference between the signal intensity of the target cell and the signal intensity of the serving cell is larger than or equal to the threshold value (operation 1203—Yes), the electronic device 101 may perform the conditional handover in operation 1205. When the difference between the signal intensity of the target cell and the signal intensity of the serving cell is smaller than the threshold value (operation 1203—No), the electronic device 101 may refrain from performing the conditional handover in operation 1207. For example, when the signal intensity 1201 of the target cell is larger than or equal to a threshold value (Th1) configured in an A1 event, the electronic device 101 may identify that satisfaction of the conditional handover execution condition fails. When the signal intensity of the serving cell is large enough, it may be highly likely to configure the execution condition not to perform the conditional handover. Accordingly, the electronic device 101 may determine that the conditional handover execution condition is not satisfied. However, when the signal intensity 1203 of the target cell is larger than the signal intensity 1201 of the serving cell by the threshold value or more, the electronic device 101 may have an actual profit in performing the conditional handover. Accordingly, even though the conditional handover execution condition configured by the network is not satisfied, the electronic device 101 may configure the conditional handover to be performed.

Figure 13A:
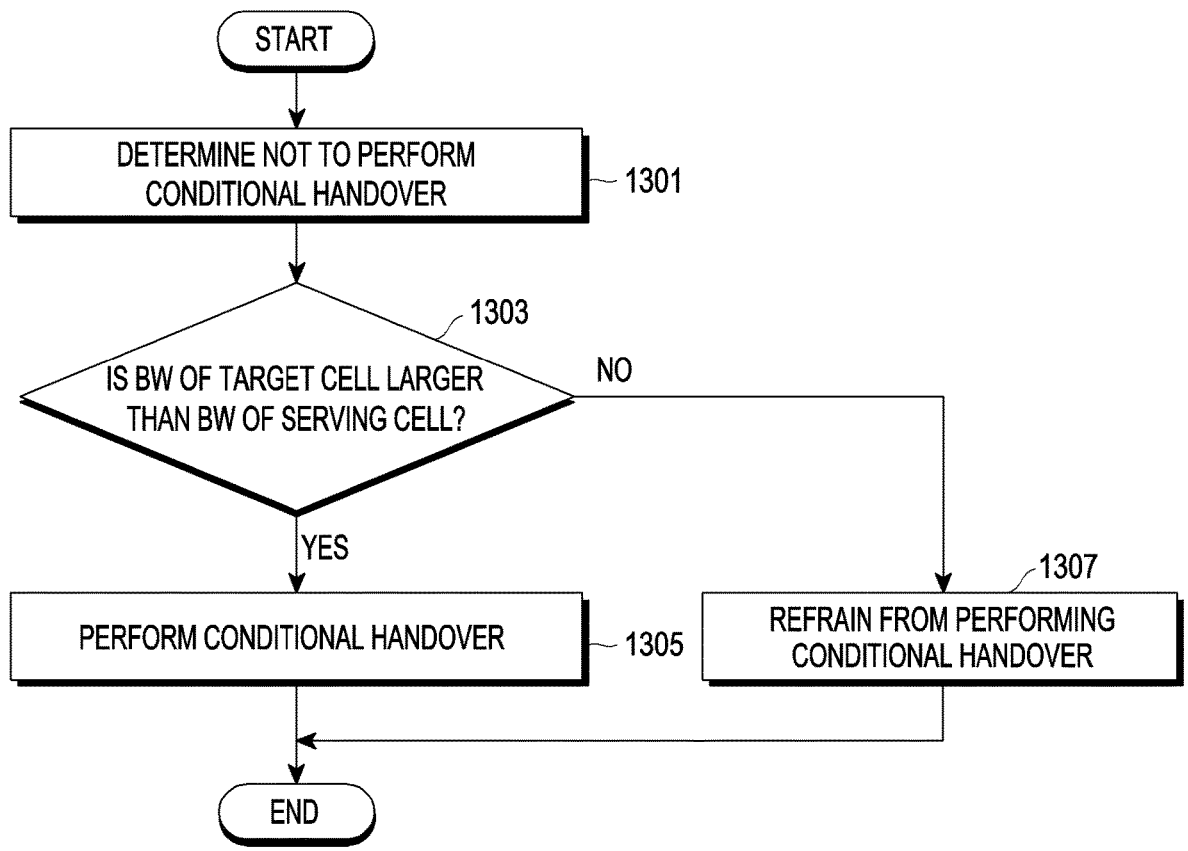
FIG. 13A is a flowchart illustrating a method of operating an electronic device according to an embodiment of the disclosure.

FIG. 13A is a flowchart illustrating a method of operating an electronic device according to an embodiment of the disclosure.

Referring to FIG. 13A, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine not to perform the conditional handover in operation 1301. For example, the electronic device 101 may identify that the conditional handover execution condition within the RRC reconfiguration message is not satisfied.

According to various embodiments of the disclosure, the electronic device 101 may determine whether a bandwidth (BW) of the target cell is larger than a bandwidth of the serving cell as at least one condition for performing the conditional handover early in operation 1303. For example, information related to the conditional handover included in the RRC reconfiguration message may include information related to candidate target cells (for example, information related to bandwidths of the candidate target cells). Accordingly, the electronic device 101 may identify a bandwidth of a specific target cell and determine whether the identified bandwidth of the target cell is larger than the bandwidth of the serving cell.

According to various embodiments of the disclosure, when the bandwidth of the target cell is larger than the bandwidth of the serving cell (operation 1303—Yes), the electronic device 101 may perform the conditional handover in operation 1305. When the bandwidth of the target cell is not larger than the bandwidth of the serving cell (operation 1303—No), the electronic device 101 may refrain from performing the conditional handover in operation 1307. Accordingly, the electronic device 101 may perform communication at a larger data rate. Meanwhile, in another embodiment of the disclosure, when a difference and/or ratio between the bandwidth of the serving cell and the bandwidth of the target cell satisfy a predetermined condition, the electronic device 101 may configure the handover to be performed even though the conditional handover execution condition is satisfied.

Figure 13B:
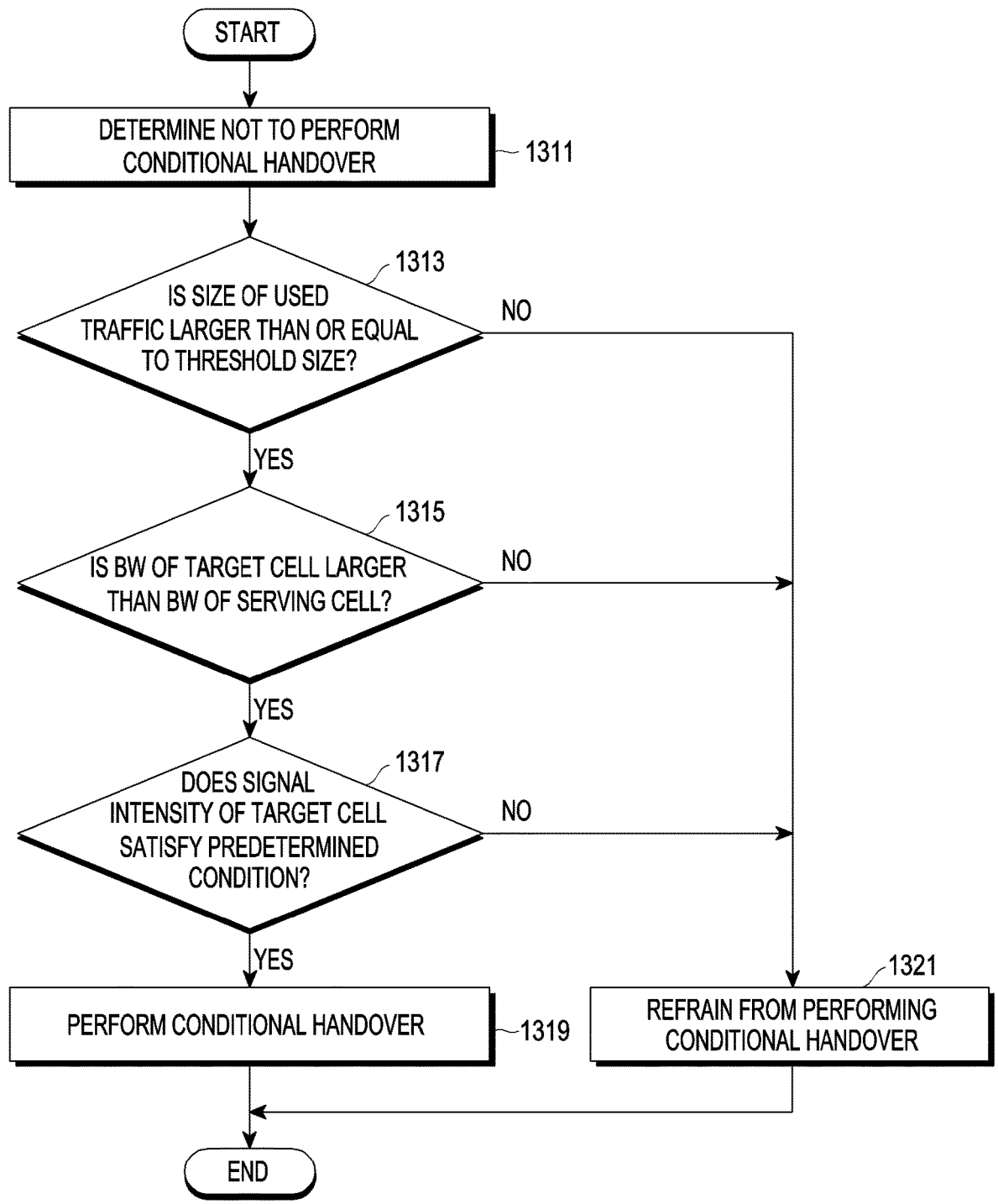
FIG. 13B is a flowchart illustrating a method of operating an electronic device according to an embodiment of the disclosure.

FIG. 13B is a flowchart illustrating a method of operating an electronic device according to an embodiment of the disclosure.

Referring to FIG. 13B, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine not to perform the conditional handover in operation 1311. For example, the electronic device 101 may identify that the conditional handover execution condition within the RRC reconfiguration message is not satisfied.

According to various embodiments of the disclosure, the electronic device 101 may determine whether the size of used traffic is larger than or equal to a threshold size in operation 1313. For example, the electronic device 101 may determine whether the traffic size is larger than or equal to the threshold size based on at least one of a resource block (RB), a GRANT, or a modulation and coding scheme (MCS), and there is no limitation on the type of a parameter for the determination. When the size of used traffic is smaller than the threshold size (operation 1313—No), the electronic device 101 may refrain from performing the conditional handover in operation 1321. When the size of traffic is relatively small although the bandwidth of the target cell is larger than the bandwidth of the serving cell, an actual profit of the handover may not be large. Damage due to the disconnection of data transmission/reception by the handover may be rather larger than the actual profit according to an increase in the bandwidth, and thus the electronic device 101 may refrain from performing the conditional handover when the size of used traffic is smaller than the threshold size.

According to various embodiments of the disclosure, when the size of used traffic is larger than or equal to the threshold size (operation 1313—Yes), the electronic device 101 may determine whether the bandwidth (BW) of the target cell is larger than the bandwidth of the serving cell in operation 1315. As described above, when the bandwidth of the target cell is not larger than the bandwidth of the serving cell (operation 1315—No), the electronic device 101 may refrain from performing the conditional handover in operation 1321. When the bandwidth of the target cell is larger than the bandwidth of the serving cell (operation 1315—Yes), the electronic device 101 may determine whether the signal intensity of the target cell satisfies a predetermined condition in operation 1317. The predetermined condition may correspond to the case in which the signal intensity of the target cell has the enough size to maintain stable communication in spite of access to the target cell. When access to the target cell is instable even though the electronic device 101 performs the handover when the bandwidth of the target cell is larger than the bandwidth of the serving cell, the electronic device 101 may declare RLF. Accordingly, when the signal intensity of the target cell satisfies the predetermined condition (operation 1317—Yes), the electronic device 101 may perform the conditional handover in operation 1319. When the signal intensity of the target cell does not satisfy the predetermined condition (operation 1317—No), the electronic device 101 may refrain from performing the conditional handover in operation 1321.

Figure 14:
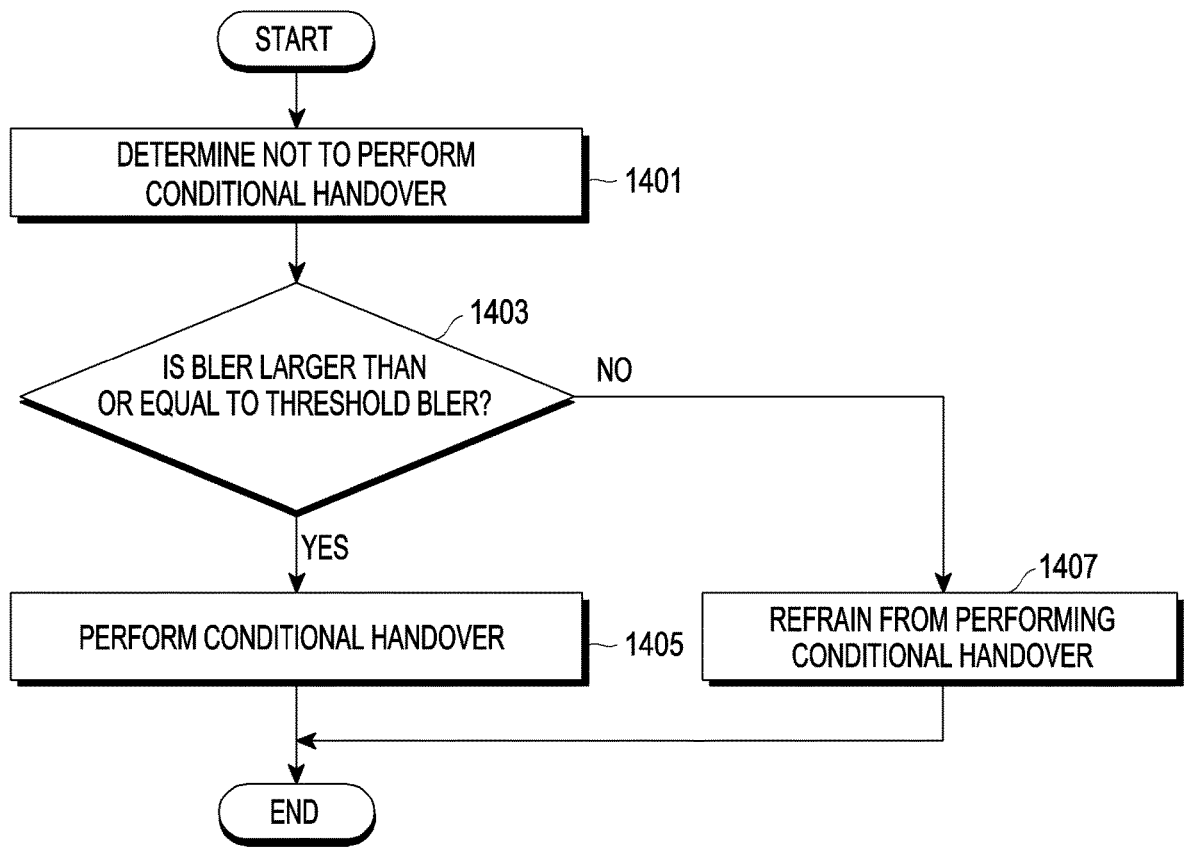
FIG. 14 is a flowchart illustrating a method of operating an electronic device according to an embodiment of the disclosure.

FIG. 14 is a flowchart illustrating a method of operating an electronic device according to an embodiment of the disclosure.

Referring to FIG. 14, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine not to perform the conditional handover in operation 1401. For example, the electronic device 101 may identify that the conditional handover execution condition within the RRC reconfiguration message is not satisfied.

According to various embodiments of the disclosure, the electronic device 101 may determine whether a BLER is larger than or equal to a threshold BLER (for example, 10%) as at least one condition for performing the conditional handover early in operation 1403. Alternatively, the electronic device 101 may determine whether a time (for example, 3 seconds) during which the BLER is maintained to be larger than or equal to the threshold BLER as at least one condition for performing the conditional handover early. Meanwhile, the BLER is only an example, and it can be understood by those skilled in the art that any index capable of representing a communication environment of the electronic device 101 can be used instead of the BLER and/or additionally.

According to various embodiments of the disclosure, when the BLER is larger than or equal to the threshold BLER (operation 1403—Yes), the electronic device 101 may perform the conditional handover in operation 1405. When the BLER is smaller than the threshold BLER (operation 1403—No), the electronic device 101 may refrain from performing the conditional handover in operation 1407. Accordingly, the electronic device 101 may perform communication in a relatively good communication environment in which communication for the target cell is stopped in a condition having a high BLER. Meanwhile, as illustrated in FIG. 13B, the electronic device 101 may be configured to perform the conditional handover when an additional condition indicating whether the signal intensity of the target cell satisfies the predetermined condition is met. For example, when the signal intensity of the target cell to which the handover is performed is relatively low even though the BLER is larger than or equal to the threshold BLER and thus the electronic device 101 performs the handover, the electronic device 101 may have a small actual profit in performing the handover. Accordingly, when the BLER is larger than or equal to the threshold BLER and the signal intensity of the target cell satisfies the predetermined condition, the electronic device 101 may perform the handover to the target cell.

Figure 15:
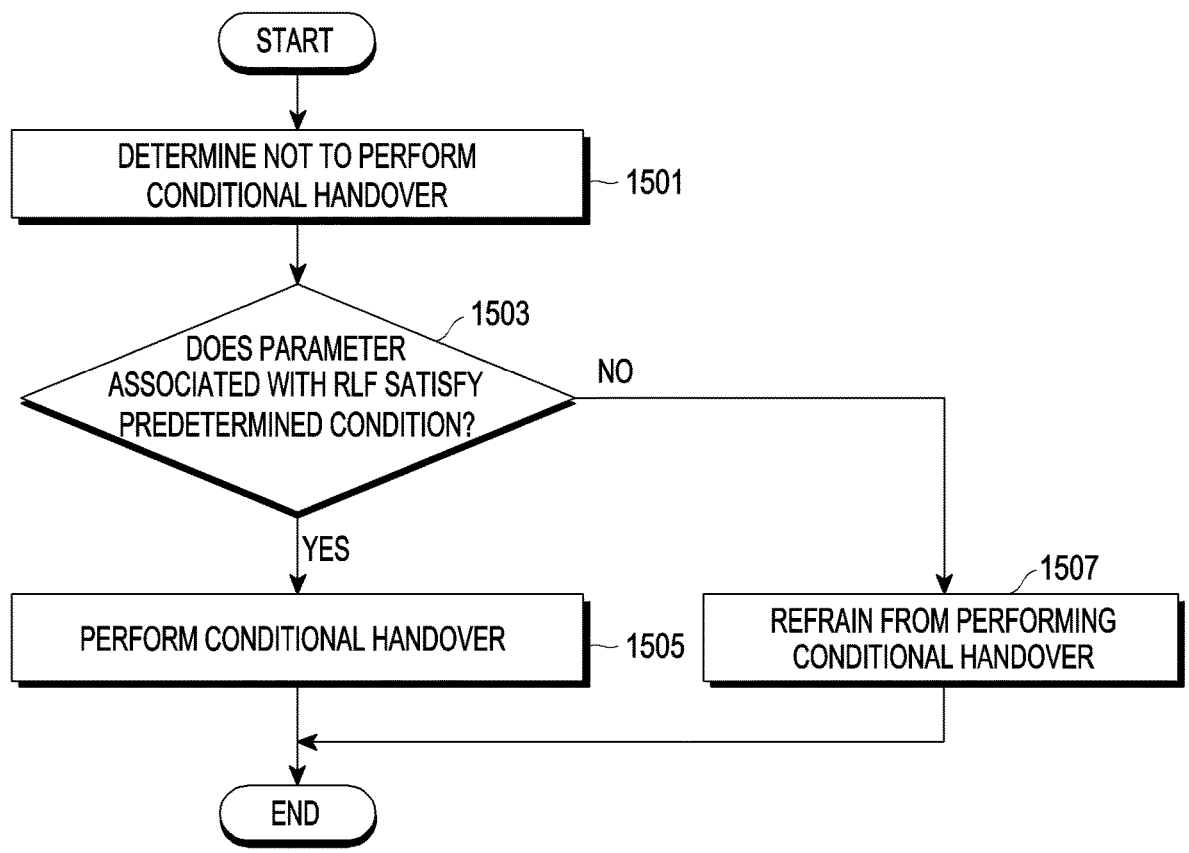
FIG. 15 is a flowchart illustrating a method of operating an electronic device according to an embodiment of the disclosure.

FIG. 15 is a flowchart illustrating a method of operating an electronic device according to an embodiment of the disclosure.

Referring to FIG. 15, the electronic device 101 (for example, at least one of the processor 120 of FIG. 1, the first communication processor 212 of FIG. 2A, the second communication processor 214 of FIG. 2A, or the integrated communication processor 260 of FIG. 2B) may determine not to perform the conditional handover in operation 1501. For example, the electronic device 101 may identify that the conditional handover execution condition within the RRC reconfiguration message is not satisfied.

According to various embodiments of the disclosure, the electronic device 101 may determine whether a parameter associated with RLF satisfies a predetermined condition as at least one condition for performing the conditional handover early in operation 1503. In one example, the parameter associated with RLF which satisfies the predetermined condition may mean that the number of RLC retransmissions is larger than or equal to a predetermined number of times. When RLC max retransmission is generated, the electronic device 101 may be configured to declare RLF. The predetermined number of times may be configured to be smaller than the RLC max retransmission. In another example, the parameter associated with RLF which satisfies the predetermined condition may mean that the number of SR retransmissions is larger than or equal to a predetermined number of times. When the SR transMax failure is generated, the electronic device 101 may be configured to declare RLF. The predetermined number of times may be configured to be smaller than SR TransMax failure.

According to various embodiments of the disclosure, when the parameter associated with RLF satisfies the predetermined condition (operation 1503—Yes), the electronic device 101 may perform the conditional handover in operation 1505. When the parameter associated with RLF does not satisfy the predetermined condition (operation 1503—No), the electronic device 101 may refrain from performing the conditional handover in operation 1507. The case in which the parameter associated with RLF satisfies the predetermined condition may mean that a possibility of declaring RLF is high. If recovery is not performed within initial one to three times after the generation of the RLF max retransmission starts, a recovery possibility before the max retransmission may be low. For example, retransmission may be repeated and may reach the RLC max retransmission. Like the RLC max retransmission, if there is no response within initial several times, an SR request may be highly likely to reach max transmission. Accordingly, the electronic device 101 may have a larger actual profit in performing the conditional handover rather than declaring RLF. Meanwhile, as illustrated in FIG. 13B, the electronic device 101 may be configured to perform the conditional handover when an additional condition indicating whether the signal intensity of the target cell satisfies the predetermined condition is met. For example, when the signal intensity of the target cell to which the handover is performed is relatively low even though the parameter associated with RLF satisfies the predetermined condition, the electronic device 101 may have a small actual profit in performing the handover. Accordingly, the electronic device 101 may perform the handover to the target cell when the parameter associated with RLF satisfies the predetermined condition and the signal intensity of the target cell satisfies the predetermined condition.

According to various embodiments of the disclosure, the electronic device 101 may include at least one processor (for example, at least one of the processor 120 of FIG. 1, the first communication processor 212 of FIG. 2A, the second communication processor 214 of FIG. 2A, or the integrated communication processor 260 of FIG. 2B), wherein the at least one processor may be configured to receive an RRC reconfiguration message including information related to a conditional handover from a serving cell, determine whether to perform the conditional handover based on the information related to the conditional handover included in the RRC reconfiguration message, determine whether at least one condition for postponing a time point at which the conditional handover is performed is satisfied based on the determination to perform the conditional handover, and postpone the time point at which the conditional handover is performed based on satisfaction of at least some of the at least one condition.

According to various embodiments of the disclosure, the at least one processor may be configured to postpone a time point at which a RACH request message for the conditional handover is transmitted, as at least a portion of an operation for postponing the time point at which the conditional handover is performed.

According to various embodiments of the disclosure, the at least one processor may be configured to postpone the time point at which the conditional handover is performed based on non-elapse of a predetermined time after access of the electronic device 101 to a target cell to which the conditional handover is determined to be performed, as at least a portion of an operation for suspending the time point at which the conditional handover is performed based on satisfaction of at least some of the at least one condition.

According to various embodiments of the disclosure, the at least one processor may be further configured to perform the handover to the target cell based on elapse of the predetermined time while the time point at which the conditional handover is performed is suspended.

According to various embodiments of the disclosure, the at least one processor may be configured to postpone the time point at which the conditional handover is performed based on identification that an ultra-low latency service is being performed by the electronic device 101, as at least a portion of an operation for suspending the time point at which the conditional handover is performed based on satisfaction of at least some of the at least one condition.

According to various embodiments of the disclosure, the at least one processor may be further configured to perform the handover to the target cell to which the conditional handover is determined to be performed based on determination that an intensity of a signal from the serving cell is equal to or smaller than a threshold intensity and/or elapse of a predetermined time after suspension of the time point at which the conditional handover is performed while the time point at which the conditional handover is performed is suspended.

According to various embodiments of the disclosure, the at least one processor may be configured to postpone the time point at which the conditional handover is performed based on identification that a voice call is being performed by the electronic device 101, as at least a portion of an operation for postponing the time point at which the conditional handover is performed based on satisfaction of at least some of the at least one condition.

According to various embodiments of the disclosure, the at least one processor may be further configured to perform the handover to the target cell to which the conditional handover is determined to be performed based on identification of a silence descriptor (SID) frame based on the voice call while the time point at which the conditional handover is performed is suspended.

According to various embodiments of the disclosure, the at least one processor may be configured to postpone the time point at which the conditional handover is performed based on non-elapse of a predetermined time after transmission or reception of first data by the electronic device 101, as at least a portion of an operation for postponing the time point at which the conditional handover is performed based on satisfaction of at least some of the at least one condition.

According to various embodiments of the disclosure, the at least one processor may be further configured to perform the handover to the target cell to which the conditional handover is determined to be performed based on elapse of the predetermined time after transmission or reception of second data transmitted or received after the first data while the time point at which the conditional handover is performed is suspended.

According to various embodiments of the disclosure, the at least one processor may be further configured to perform the handover to the target cell to which the conditional handover is determined to be performed based on satisfaction of at least one condition for stopping suspension of the conditional handover while the time point at which the conditional handover is performed is suspended.

According to various embodiments of the disclosure, the at least one processor may be configured to transmit a RACH request message to the target cell, as at least a portion of an operation for performing the handover to the target cell to which the conditional handover is determined to be performed.

According to various embodiments of the disclosure, the at least one processor may be further configured to determine whether at least one condition for postponing the time point at which the conditional handover is performed is suspended based on satisfaction of an execution condition of the conditional handover included in the RRC reconfiguration message, as at least a portion of an operation for determining whether at least one condition for postponing the time point at which the conditional handover is performed is satisfied based on determination to perform the conditional handover, and further configured to refrain from performing the conditional handover based on identification that the execution condition of the conditional handover is not satisfied while the time point at which the conditional handover is performed is suspended.

According to various embodiments of the disclosure, the at least one processor may be further configured to determine whether to perform a handover related to another execution condition based on identification that the another execution condition different from the execution condition of the conditional handover is satisfied while the time point at which the conditional handover is performed is suspended.

According to various embodiments of the disclosure, the electronic device 101 may include at least one processor (for example, at least one of the processor 120 of FIG. 1, the first communication processor 212 of FIG. 2A, the second communication processor 214 of FIG. 2A, or the integrated communication processor 260 of FIG. 2B), wherein the at least one processor may be configured to receive an RRC reconfiguration message including information related to a conditional handover from a serving cell, identify that an execution condition of a conditional handover to a target cell included in the information relate to the conditional handover of the RRC reconfiguration message is not satisfied, determine whether at least one condition for performing the conditional handover to the target cell early is satisfied based on non-satisfaction of the execution condition of the conditional handover, and perform the handover to the target cell based on satisfaction of the at least one condition for performing the conditional handover early.

According to various embodiments of the disclosure, the at least one processor may be configured to perform the handover to the target cell based on identification that a difference between a signal intensity of the target cell and a signal intensity of the serving cell is larger than or equal to a threshold value, as at least a portion of an operation for performing the conditional handover to the target cell based on satisfaction of the at least one condition for performing the conditional handover early.

According to various embodiments of the disclosure, the at least one processor may be configured to perform the handover to the target cell based on identification that a bandwidth of the target cell identified from the information related to the conditional handover of the RRC reconfiguration message is larger than a bandwidth of the serving cell, as at least a portion of an operation for performing the conditional handover to the target cell based on satisfaction of the at least one condition for performing the conditional handover early.

According to various embodiments of the disclosure, the at least one processor may be configured to perform the handover to the target cell based on identification that a BLER identified during data transmission or reception to or from the serving cell is larger than or equal to a threshold BLER, as at least a portion of an operation for performing the conditional handover to the target cell based on satisfaction of the at least one condition for performing the conditional handover early.

According to various embodiments of the disclosure, the at least one processor may be configured to perform the handover to the target cell based on identification that at least one parameter associated to RLF during data transmission or reception to or from the serving cell satisfies a predetermined condition, as at least a portion of an operation for performing the conditional handover to the target cell based on satisfaction of the at least one condition for performing the conditional handover early.

According to various embodiments of the disclosure, a method of operating the electronic device 101 may include an operation of receiving an RRC reconfiguration message including information related to a conditional handover from a serving cell, an operation of determining whether to perform the conditional handover based on the information related to the conditional handover included in the RRC reconfiguration message, an operation of determining whether at least one condition for postponing a time point at which the conditional handover is performed is satisfied based on the determination to perform the conditional handover, and an operation of postponing the time point at which the conditional handover is performed based on satisfaction of at least some of the at least one condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may also be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
at least one processor,
wherein the at least one processor is configured to:
receive a radio resource control (RRC) reconfiguration message including at least one first condition related to a conditional handover from a serving cell,
determine to perform the conditional handover, based on the at least one first condition related to the conditional handover included in the RRC reconfiguration message,
determine whether at least one second condition for suspending the conditional handover is satisfied, the at least one second condition being set by the electronic device, and
suspend transmitting a random access preamble for the conditional handover, based on satisfaction of at least one of the at least one second condition,
wherein the at least one second condition includes identification that a voice call is being performed by the electronic device, and
wherein the at least one processor is further configured to perform the conditional handover to a target cell to which the conditional handover is determined to be performed, based on identification of a silence descriptor (SID) frame based on the voice call while transmitting the random access preamble for the conditional handover is suspended.

2. The electronic device of claim 1, wherein the at least one processor is further configured to postpone a time point at which the conditional handover is performed, based on non-elapse of a predetermined time after access of the electronic device to a target cell to which the conditional handover is determined to be performed, as at least a portion of an operation for suspending transmitting the random access preamble for the conditional handover, based on satisfaction of at least one of the at least one second condition.

3. The electronic device of claim 2, wherein the at least one processor is further configured to perform the conditional handover to the target cell, based on elapse of the predetermined time while transmitting the random access preamble for the conditional handover is suspended.

4. The electronic device of claim 1, wherein the at least one processor is further configured to suspend transmitting the random access preamble for the conditional handover, based on identification that an ultra-low latency service is being performed by the electronic device, as at least a portion of an operation for suspending transmitting the random access preamble for the conditional handover, based on satisfaction of at least one of the at least one second condition.

5. The electronic device of claim 4, wherein the at least one processor is further configured to perform the conditional handover to a target cell to which the conditional handover is determined to be performed, based on determination that an intensity of a signal from the serving cell is equal to or smaller than a threshold intensity and/or elapse of a predetermined time after suspension of the conditional handover while transmitting the random access preamble for the conditional handover is performed is suspended.

6. The electronic device of claim 1, wherein the at least one processor is further configured to suspend transmitting the random access preamble for the conditional handover, based on non-elapse of a predetermined time after transmission or reception of first data by the electronic device, as at least a portion of an operation for suspending transmitting the random access preamble for the conditional handover, based on satisfaction of at least one of the at least one second condition.

7. The electronic device of claim 6, wherein the at least one processor is further configured to perform the conditional handover to a target cell to which the conditional handover is determined to be performed, based on elapse of the predetermined time after transmission or reception of second data transmitted or received after the first data while transmitting the random access preamble for the conditional handover is suspended.

8. The electronic device of claim 1, wherein the at least one processor is further configured to transmit a random access channel (RACH) request message to a target cell, as at least a portion of an operation for performing the conditional handover to the target cell to which the conditional handover is determined to be performed.

9. The electronic device of claim 1, wherein the at least one processor is further configured to:
   determine whether at least one second condition for suspending transmitting the random access preamble for the conditional handover is satisfied, based on satisfaction of an execution condition of the conditional handover included in the RRC reconfiguration message, as at least a portion of an operation for determining whether at least one second condition for suspending the conditional handover is satisfied, and
   refrain from performing the conditional handover, based on identification that the execution condition of the conditional handover is not satisfied while transmitting the random access preamble for the conditional handover is suspended.

10. The electronic device of claim 9, wherein the at least one processor is further configured to determine to perform a handover related to another execution condition, based on identification that the other execution condition different from the execution condition of the conditional handover is satisfied while transmitting the random access preamble for the conditional handover is suspended.

11. An electronic device comprising:
   at least one processor,
   wherein the at least one processor is configured to:
      receive a radio resource control (RRC) reconfiguration message including information related to a conditional handover from a serving cell,
      identify that a first condition of a conditional handover to a target cell included in the information related to the conditional handover of the RRC reconfiguration message is not satisfied,
      determine whether at least one second condition for performing the conditional handover to the target cell early is satisfied, the at least one second condition being set by the electronic device, and
      transmit, to the target cell, a random access preamble for the conditional handover to the target cell, based on satisfaction of the at least one second condition for performing the conditional handover early,
   wherein the at least one second condition includes identification that a voice call is being performed by the electronic device, and
   wherein the at least one processor is further configured to perform the conditional handover to a target cell to which the conditional handover is determined to be performed, based on identification of a silence descriptor (SID) frame based on the voice call while transmitting the random access preamble for the conditional handover is suspended.

12. The electronic device of claim 11, wherein the at least one processor is further configured to perform the conditional handover to the target cell, based on identification that a difference between a signal intensity of the target cell and a signal intensity of the serving cell is larger than or equal to a threshold value, as at least a portion of an operation for transmitting, to the target cell, the random access preamble for the conditional handover to the target cell, based on satisfaction of the at least one second condition for performing the conditional handover early.

13. The electronic device of claim 11, wherein the at least one processor is further configured to perform the conditional handover to the target cell, based on identification that a bandwidth of the target cell identified from the information related to the conditional handover of the RRC reconfiguration message is larger than a bandwidth of the serving cell, as at least a portion of an operation for transmitting, to the target cell, the random access preamble for the conditional handover to the target cell, based on satisfaction of the at least one second condition for performing the conditional handover early.

14. The electronic device of claim 11, wherein the at least one processor is further configured to perform the conditional handover to the target cell, based on identification that a block error rate (BLER) identified during data transmission or reception to or from the serving cell is larger than or equal to a threshold BLER, as at least a portion of an operation for transmitting, to the target cell, the random access preamble for the conditional handover to the target cell, based on satisfaction of the at least one second condition for performing the conditional handover early.

15. The electronic device of claim 11, wherein the at least one processor is further configured to perform the conditional handover to the target cell, based on identification that at least one parameter associated to radio link failure (RLF) during data transmission or reception to or from the serving cell satisfies a predetermined condition, as at least a portion of an operation for transmitting, to the target cell, the random access preamble for the conditional handover to the target cell, based on satisfaction of the at least one second condition for performing the conditional handover early.

16. A method of operating an electronic device, the method comprising:
   receiving a radio resource control (RRC) reconfiguration message including at least one first condition related to a conditional handover from a serving cell;
   determining to perform the conditional handover, based on the at least one first condition related to the conditional handover included in the RRC reconfiguration message;
   determining whether at least one second condition for suspending the conditional handover is satisfied, the at least one second condition being set by the electronic device; and
   suspending transmitting a random access preamble for the conditional handover, based on satisfaction of at least one of the at least one second condition,
   wherein the at least one second condition includes identification that a voice call is being performed by the electronic device, and
   wherein the method further comprises performing the conditional handover to a target cell to which the conditional handover is determined to be performed, based on identification of a silence descriptor (SID) frame based on the voice call while transmitting the random access preamble for the conditional handover is suspended.

* * * * *